US010329750B2

(12) United States Patent
Yuan et al.

(10) Patent No.: US 10,329,750 B2
(45) Date of Patent: Jun. 25, 2019

(54) FAUCETS PROVIDING WATER-AND-AIR FLOW

(71) Applicant: GLOBE UNION INDUSTRIAL CORP., Taichung (TW)

(72) Inventors: Chiahua Yuan, Taichung (TW); Yiping Lin, Taichung (TW); Huiling Chiu, Taichung (TW); Yuanhao Chang, Taichung (TW)

(73) Assignee: GLOBE UNION INDUSTRIAL CORP., Taichung (TW)

( * ) Notice: Subject to any disclaimer, the term of this patent is extended or adjusted under 35 U.S.C. 154(b) by 0 days.

(21) Appl. No.: 15/895,925

(22) Filed: Feb. 13, 2018

(65) Prior Publication Data
US 2018/0179742 A1    Jun. 28, 2018

Related U.S. Application Data

(63) Continuation-in-part of application No. 15/189,087, filed on Jun. 22, 2016, now Pat. No. 10,106,965.

(51) Int. Cl.
*E03C 1/02*    (2006.01)
*E03C 1/04*    (2006.01)
(Continued)

(52) U.S. Cl.
CPC .......... *E03C 1/0405* (2013.01); *E03C 1/0404* (2013.01); *F16K 11/22* (2013.01);
(Continued)

(58) Field of Classification Search
CPC ............. E03C 1/0405; E03C 2001/026; E03C 2001/0415; E03C 1/0404; F16K 21/06;
(Continued)

(56) References Cited

U.S. PATENT DOCUMENTS 3,144,878 A    8/1964  Williams
3,580,503 A    5/1971  Ligon et al.
(Continued)

FOREIGN PATENT DOCUMENTS

CN    205331574 U    6/2016
CN    205479654 U    8/2016
(Continued)

OTHER PUBLICATIONS

Extended European Search Report pursuant to Rule 62 EPC, the European Search Report (R. 61 EPC) or the partial European Search Report/Declaration of no search (R. 63 EPC) and the European Search Opinion issued in corresponding Foreign Application No. 16184186.1-1608 (9 pgs.).

*Primary Examiner* — Marina A Tiet Jen
*Assistant Examiner* — Frederick D Soski
(74) *Attorney, Agent, or Firm* — Finnegan, Henderson, Farabow, Garrett & Dunner LLP

(57)    ABSTRACT

A faucet having a faucet base, a water hose, a faucet head, and a chamber is provided. A water valve is provided in the chamber and includes a driving member and a control valve movable between a first position enabling mixing of water and air and a second position enabling shut-off of a water flow. The faucet head further includes a push-to-rotate member movably coupled with the faucet head to enable operating the control valve within the water valve by operating the push member from or near a side of the faucet head.

15 Claims, 16 Drawing Sheets

(51) Int. Cl.
*B05B 12/00* (2018.01)
*F16K 11/22* (2006.01)
*F16K 21/06* (2006.01)
*F16K 31/524* (2006.01)
*F16K 31/528* (2006.01)

(52) U.S. Cl.
CPC .......... *F16K 21/06* (2013.01); *F16K 31/5284* (2013.01); *F16K 31/52458* (2013.01); *F16K 31/52491* (2013.01); *B05B 12/002* (2013.01); *E03C 2001/026* (2013.01); *E03C 2001/0415* (2013.01)

(58) Field of Classification Search
CPC ........... F16K 31/52458; F16K 31/5284; F16K 11/22; F16K 31/52491; B05B 12/002; Y10T 137/9464
See application file for complete search history.

(56) References Cited

U.S. PATENT DOCUMENTS

| | | | |
|---|---|---|---|
| 4,496,966 A | 1/1985 | Hausdorfer et al. | |
| 4,522,592 A | 6/1985 | Johnson | |
| 5,100,055 A | 3/1992 | Rokitenetz et al. | |
| 5,312,049 A | 5/1994 | Bayler | |
| 6,131,608 A | 10/2000 | Lu | |
| 8,424,781 B2 | 4/2013 | Rosko | |
| 8,757,518 B2 | 6/2014 | Kao et al. | |
| 9,175,459 B2 | 11/2015 | Zhang et al. | |
| 9,707,572 B2 | 7/2017 | Erickson et al. | |
| 9,708,800 B2 | 7/2017 | Bosio | |
| 2002/0185553 A1* | 12/2002 | Benstead | B05B 1/1618 239/428.5 |
| 2004/0112985 A1* | 6/2004 | Malek | B05B 1/1618 239/445 |
| 2005/0001064 A1 | 1/2005 | Taketomi et al. | |
| 2007/0069169 A1 | 3/2007 | Lin | |
| 2008/0276367 A1 | 11/2008 | Bares et al. | |
| 2011/0049273 A1 | 3/2011 | Huang | |
| 2014/0026980 A1 | 1/2014 | Esche et al. | |
| 2014/0069520 A1 | 3/2014 | Esche et al. | |
| 2016/0222635 A1 | 8/2016 | Yuan et al. | |
| 2017/0058496 A1 | 3/2017 | Chiu et al. | |
| 2017/0059050 A1 | 3/2017 | Chiu et al. | |
| 2017/0059051 A1 | 3/2017 | Chiu et al. | |

FOREIGN PATENT DOCUMENTS

| | | |
|---|---|---|
| CN | 205745594 U | 11/2016 |
| CN | 206054896 U | 3/2017 |
| CN | 104879556 B | 6/2017 |
| CN | 206320347 U | 7/2017 |
| CN | 206338480 U | 7/2017 |
| DE | 10 2016 115 796 A1 | 3/2017 |
| EP | 3 135 832 A1 | 8/2016 |
| TW | I228578 | 3/2005 |
| TW | M382408 | 6/2010 |
| TW | M432670 | 7/2012 |
| TW | I369459 | 8/2012 |
| TW | M452280 | 5/2013 |
| TW | 1567272 B | 1/2017 |
| WO | WO 2008/137034 A1 | 11/2008 |

* cited by examiner

FAUCETS PROVIDING WATER-AND-AIR FLOW

CROSS-REFERENCE TO RELATED APPLICATION

This application is a Continuation-in-Part Application of application Ser. No. 15/189,087, which was filed Jun. 22, 2016.

TECHNICAL FIELD

The present invention relates to faucets providing mixed water-and-air flow, including faucets having a faucet head with a push member to control a water valve enabling the mixing of water and air.

BACKGROUND

Control valves for faucets have various components, many of which are discrete parts that are assembled to ensure good water-tight seal and long-term durability or reliability. The manufacturing of faucets, however, can become complicated and expensive as the features, controls, and/or functions of faucets are revised over time.

For certain water faucet applications, one-touch valves were developed so a tap on an actuation element can control the water to flow through those valves. An example of one-touch valves is those supplied by the 3M Company for mounting externally to a faucet. A one-touch valve may simplify the operation of a faucet. However, these one-touch valves are add-on components for being placed at where water is discharged, i.e., directly at the outlet of a faucet. This also means that the valves are operated directly at the outlet where water flows through.

But adding a one-touch valve changes the overall design, dimension, and aesthetic appearance of a faucet, limiting the flexibility and/or attractiveness of the design or application. A post-sale-modification may raise reliability, durability, or repair issues. Further, operating a faucet outlet with hands, arms, or other bodily parts, which may have grease, bacteria, or other contaminants, adds grease, bacteria, or other contaminants to the faucet outlet itself, leading to hygiene or other concerns.

Conventional faucets contain handles to control water flow. When the faucet is operated in circumstances that require frequent on/off operations, having handles that are away from the location where water is discharged may cause inconvenience. Although placing a handle near the location where water is discharged may be a solution, it may limit design options. For example, if a faucet has a removable head that travels with a connecting hose, the location of the control may affect the mobility of the faucet head or hose, limit options for faucet design, or limit its portability.

SUMMARY

According to a disclosed embodiment, there is provided a faucet. The faucet can include a faucet base, a water hose, a faucet head, a chamber, a water valve, and a push member.

The faucet base can include a first end and a second end. The faucet base can be adapted to be mounted to support the faucet near the first end and to regulate a water flow.

The water hose can be coupled with the faucet base by extending through the first end and second end of the faucet base. The water hose can be adapted to be flexible and movable through an opening in the first end and through an opening in the second end.

The faucet head can be movably coupled to the second end of the faucet base. The faucet head can be adapted to be dismountable from the second end of the faucet base while remaining coupled to the water hose to direct a mixture of water-and-air flow to a location away from the faucet base and to be relocated back to the second end the faucet base to discharge the mixture of water-and-air flow while being coupled to the faucet base.

The chamber can be provided within the faucet head having a first end and a second end. The first end of the chamber can be coupled with the water hose and can be coupled, in a dismountable manner, to the second end of the faucet base. The second end of the chamber can provide an outlet to discharge the mixture of water-and-air flow.

The water valve can be provided within the chamber between the first end and the second end of the chamber. The water valve can include at least one air inlet and a water inlet to enable mixing air from the at least one air inlet with water from the water inlet. The water inlet can be coupled with the water hose. The at least one air inlet can be coupled with the chamber.

The water valve can further include a control valve movable within the water valve between a first position and a second position. The first position of the control valve can enable mixing air from the at least one air inlet with water from the water inlet to provide the mixture of water-and-air flow. The second position of the control valve can enable shut-off of the mixture of water-and-air flow. A direction of the control valve's movement between the first position and the second position can be substantially parallel to a direction of a water flow from the first end of the chamber to the second end of the chamber. The control valve can be adapted to use a water pressure from the water supplied by the water hose to facilitate an operation of the control valve.

The push member can be movably coupled with the faucet head and can include a plunger and a rotating device movably coupled to the plunger and the control valve. The push member can be adapted to enable an operation of the control valve within the water valve by pressing the plunger from a side of the faucet head to cause the rotating device to rotate between a first angular position and a second angular position relative to the plunger. A rotation of the rotating device between the first and second angular positions can cause the control valve to move between the first position and the second position.

According to another disclosed embodiment, there is provided a faucet. The faucet can include a faucet base, a water hose, a faucet head, a water valve, and a push member.

The faucet base can include a first end and a second end.

The water hose can extend within the faucet base and can be movable through the second end of the faucet base.

The faucet head can include a first end, a second end, a chamber between the first end and the second end of the faucet head and coupled with the water hose, and an outlet coupled with the chamber at or near the second end of the faucet head to discharge a mixture of water-and-air flow. The first end of the faucet head can be adapted to be coupled to the second end of the faucet base while remaining coupled to the water hose. The first end of the faucet head can be adapted to be dismountable from the second end of the faucet base while remaining coupled to the water hose.

The water valve can be provided within the chamber. The water valve can include one or more air inlets and a water inlet to enable mixing air from the one or more air inlets with water from the water inlet. The water inlet can be coupled with the water hose. The one or more air inlets can be coupled with the chamber.

The water valve can further include a control valve movable within the water valve between a first position and a second position. The first position of the control valve can enable mixing air from the air inlet with water from the water inlet to provide the mixture of water-and-air flow. The second position of the control valve can enable shut-off of the mixture of water-and-air flow. The control valve can be adapted to move between the first position and the second position in a direction that is substantially parallel to a direction of a water flow from the first end of the faucet head to the second end of the faucet head. The control valve can be adapted to use a water pressure from the water supplied by the water hose to facilitate an operation of the control valve.

According to yet another disclosed embodiment, there is provided a faucet. The faucet can include a faucet base, a water hose, a faucet head, a water valve, a push member.

The faucet base can include a first end, second end, and a water flow control coupled near the first end for regulating a water flow through the faucet. The first end of the faucet base can be adapted to be mounted to support the faucet.

The water hose can be accommodated between the first end and second end of the faucet base and movable through an opening near the first end and an opening near the second end of the faucet base.

The faucet head can be coupled to the water hose and, in a dismountable manner, to the second end of the faucet base while remaining coupled to the water hose.

The chamber can be provided within the faucet head. The chamber can have a first and second end. The first end of the chamber can be coupled with the water hose and can be coupled, in a dismountable manner, to the second end of the faucet base. The chamber can be adapted to discharge a mixture of water-and-air flow near the second end of the chamber.

The water valve can be provided within the chamber and can be located between the first and second end of the chamber. The water valve can include an air inlet and a water inlet to enable mixing air from the air inlet with water from the water inlet to provide the mixture of water-and-air flow. The water inlet can be coupled with the water hose. The air inlet can be coupled with the chamber.

The water valve can further include a control valve movable within the water valve between a first position and a second position in a direction approximately parallel with a direction of a water flow from the first end of the chamber to the second end of the chamber. The first position of the control valve can enable mixing air from the air inlet with water from the water inlet to provide the mixture of water-and-air flow. The second position of the control valve can enable shut-off of the mixture of water-and-air flow. An operation of the control valve can be facilitated by a water pressure supplied by the water hose.

The push member can be movably coupled with the faucet head. The push member can include a plunger, a rotating device movably coupled to the plunger and the control valve, and a spring coupled to the rotating device to urge the rotating device towards the plunger.

The push member can be adapted to enable an operation of the control valve within the water valve by pressing the plunger from a side of the faucet head to cause the rotating device to rotate between a first angular position and a second angular position relative to a center axis of the plunger. A rotation of the rotating device between the first and second angular positions can cause the control valve to move between the first position and the second position.

The plunger can be adapted to drive the rotating device, while the plunger is being pressed, and cause the rotation device to rotate upon the urging of the spring.

DETAILED DESCRIPTION

Figure 1:
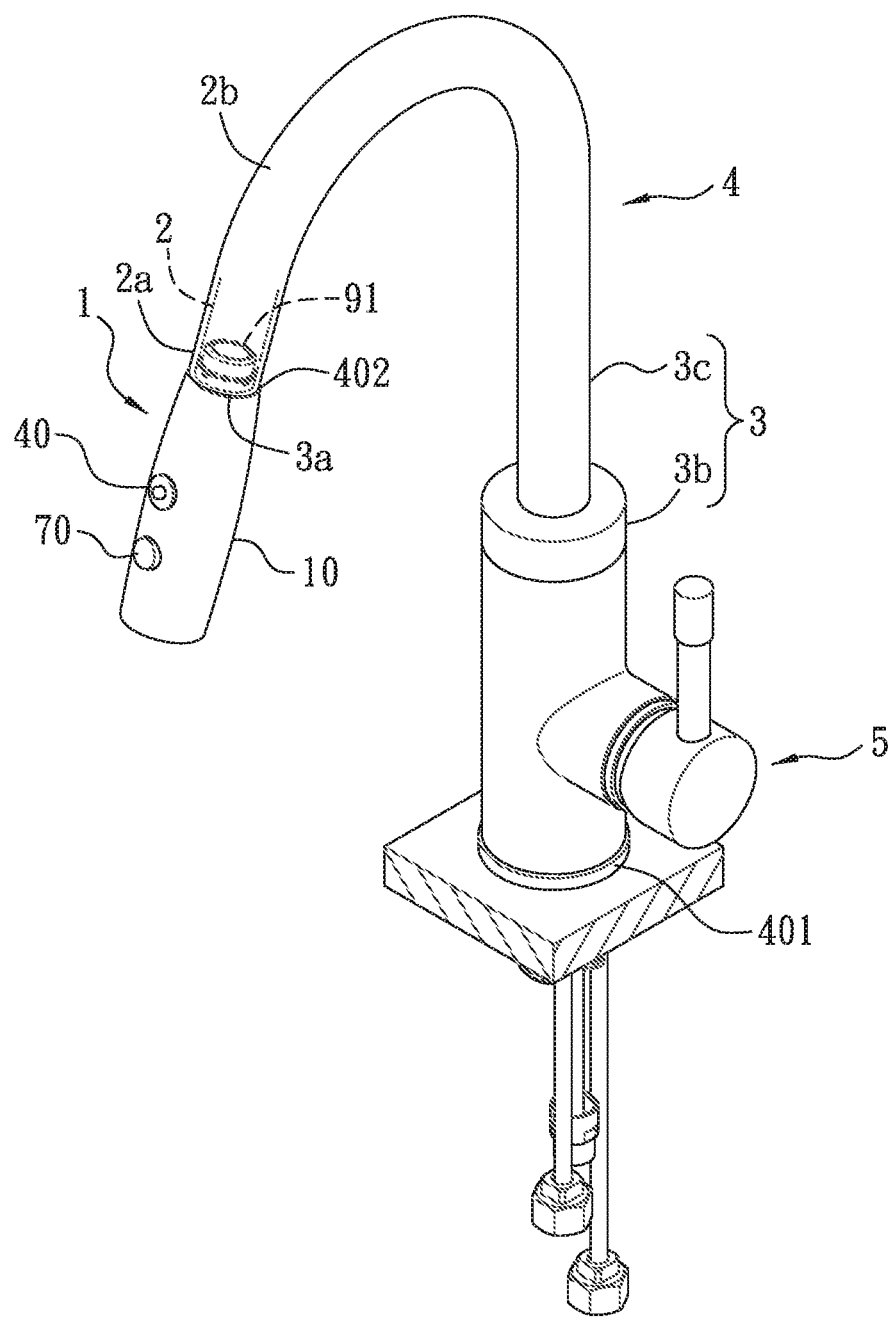
FIG. 1 is a perspective view illustrating an embodiment of a faucet consistent with the present invention.

Referring to FIG. 1, one embodiment of the present invention provides a faucet including a faucet base 4, a water hose 2, and a faucet head 1. Faucet base 4 can include a first end 401 and a second end 402. Water hose 2 can be coupled to faucet base 4 by extending through first end 401 and second end 402 of faucet base 4. Water hose 2 can be adapted to be flexible and movable through an opening of first end 401 and through an opening of second end 402 of faucet base 4. Faucet head 1 can be movably coupled to second end 402 of faucet base 4. Faucet head 1 can be adapted to be dismountable, and can be pulled away, for example, from faucet base 4 while remaining coupled to water hose 2 to direct water to a location away from faucet base 4. Faucet head 1 can be adapted to be relocated back to faucet base 4.

Faucet base 4 can be mounted to support the faucet near first end 401 and to regulate water flow through the faucet. Faucet base 4 can include a water flow control 5 coupled with water hose 2 and located near first end 401 of faucet base 4 to control an amount of water flowing through water hose 2 and to vary a mix of cold water and hot water going into water hose 2. For example, water flow control 5 can be mounted near a lower portion of faucet base 4 near a side opening of faucet base 4. Water flow control 5 can be coupled with water hose 2, a cold water intake, and a hot water intake to vary, when a water flow is enabled, a mix of cold water and hot water going into water hose 2.

Figure 2:
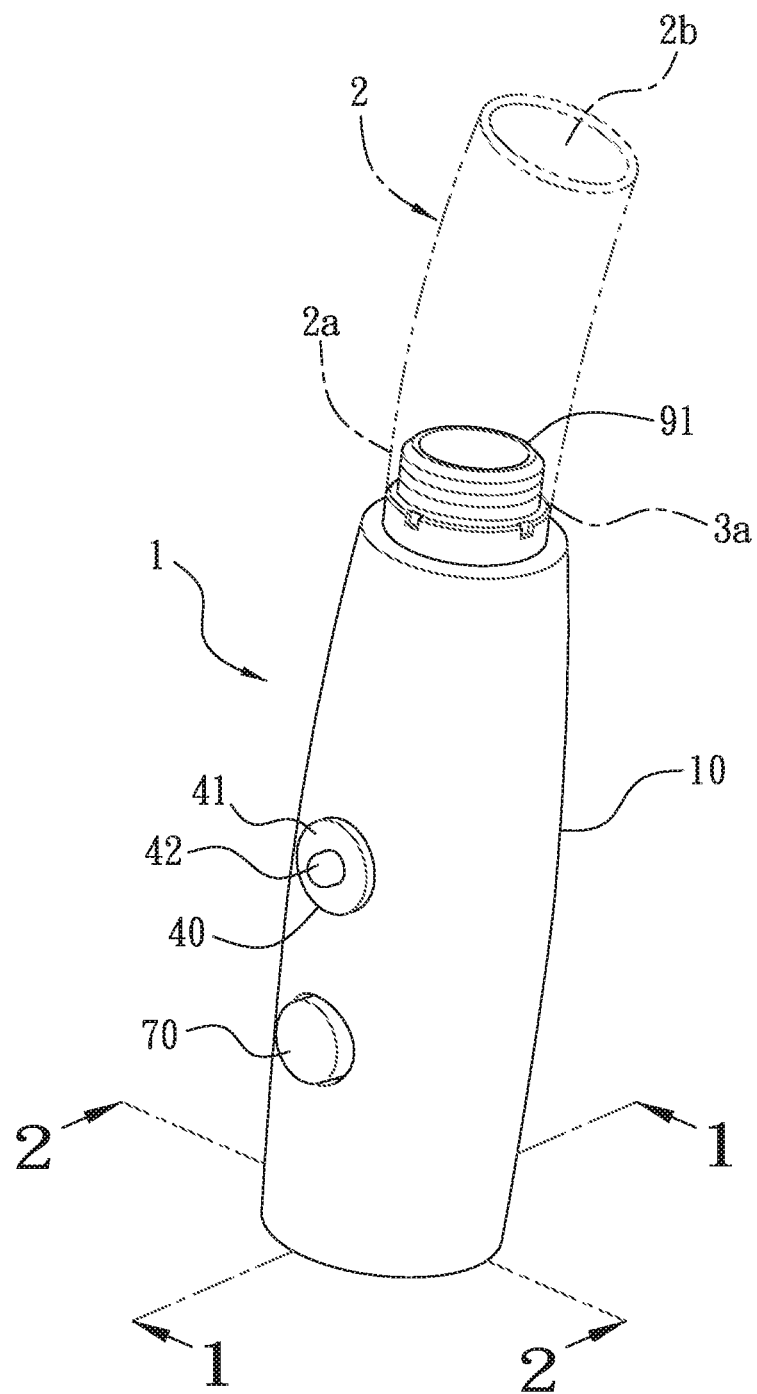
FIG. 2 is a perspective view illustrating an embodiment of a faucet head consistent with the present invention, with dotted line illustrating a water hose.

Referring to FIGS. 1 and 2, a faucet head 1 can be mounted on a pull-out faucet base 4 or a pull-down faucet base 4, which can include a body portion 3 and, for example, can be mounted in a kitchen or a bathroom, such as over or near a sink. Faucet head 1 can be coupled with a water supply segment 2a of water hose 2, and water hose 2 can be movably accommodated within and slidable through faucet base 4. Water hose 2 can include a water conduit 2b defined therein. Faucet head 1 and water hose 2 can be pulled out and retracted back to an outlet 3a at second end 402 of faucet base 4. Body portion 3 of faucet base 4 can include a base holder 3b and a tubular extension 3c extending from holder 3b and, in some embodiments, bend forward and downward as illustrated in FIG. 1. The amount of the bend, illustrated like a swan neck in FIG. 1, may depend on aesthetic designs, faucet applications, cost/manufacturing considerations, and/or other factors. Water hose 2 can extend through holder 3b and tubular extension 3c.

Figure 3:
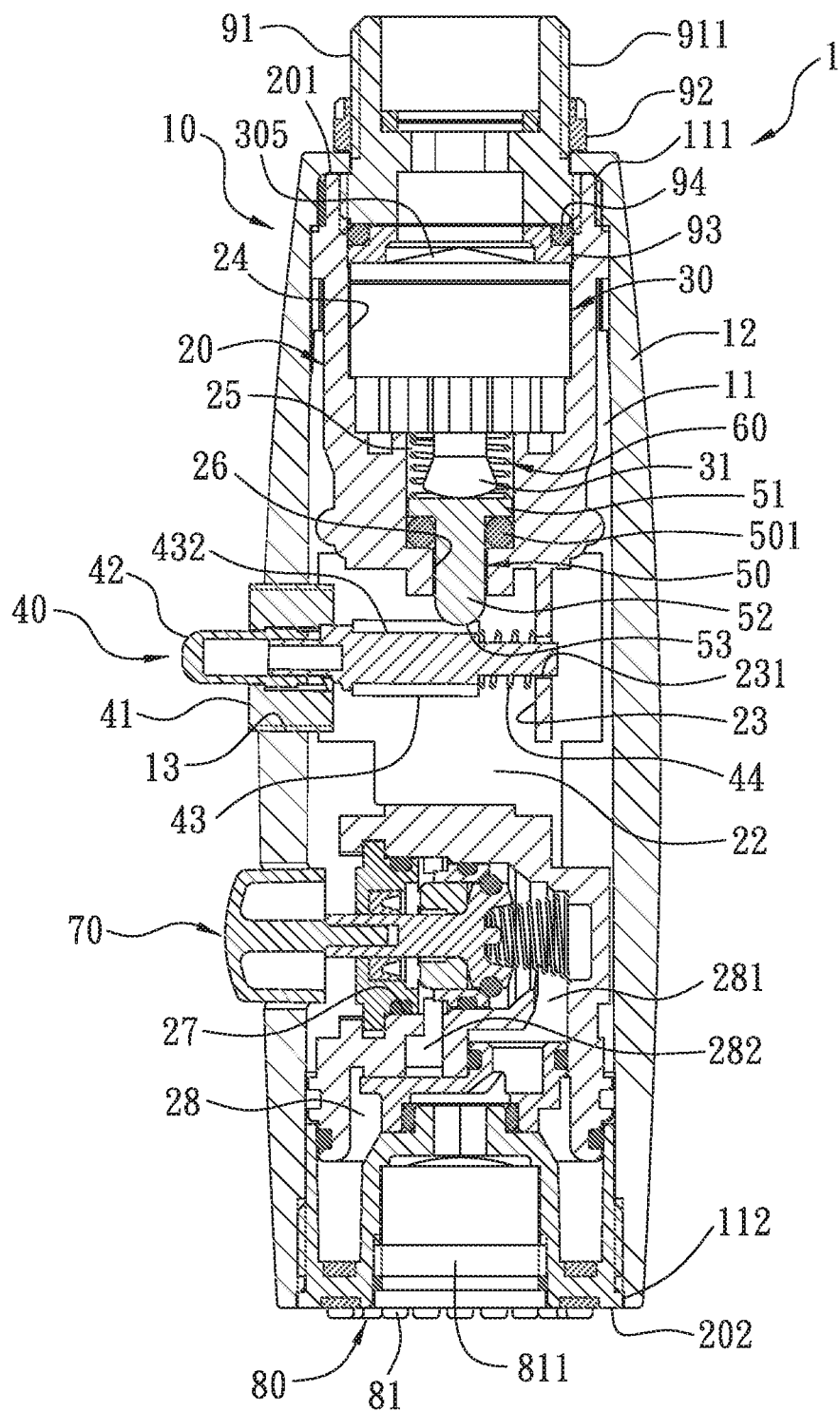
FIG. 3 is a cross-sectional view of an embodiment of a faucet head, taken along line 1-1 of FIG. 2.
Figure 4:
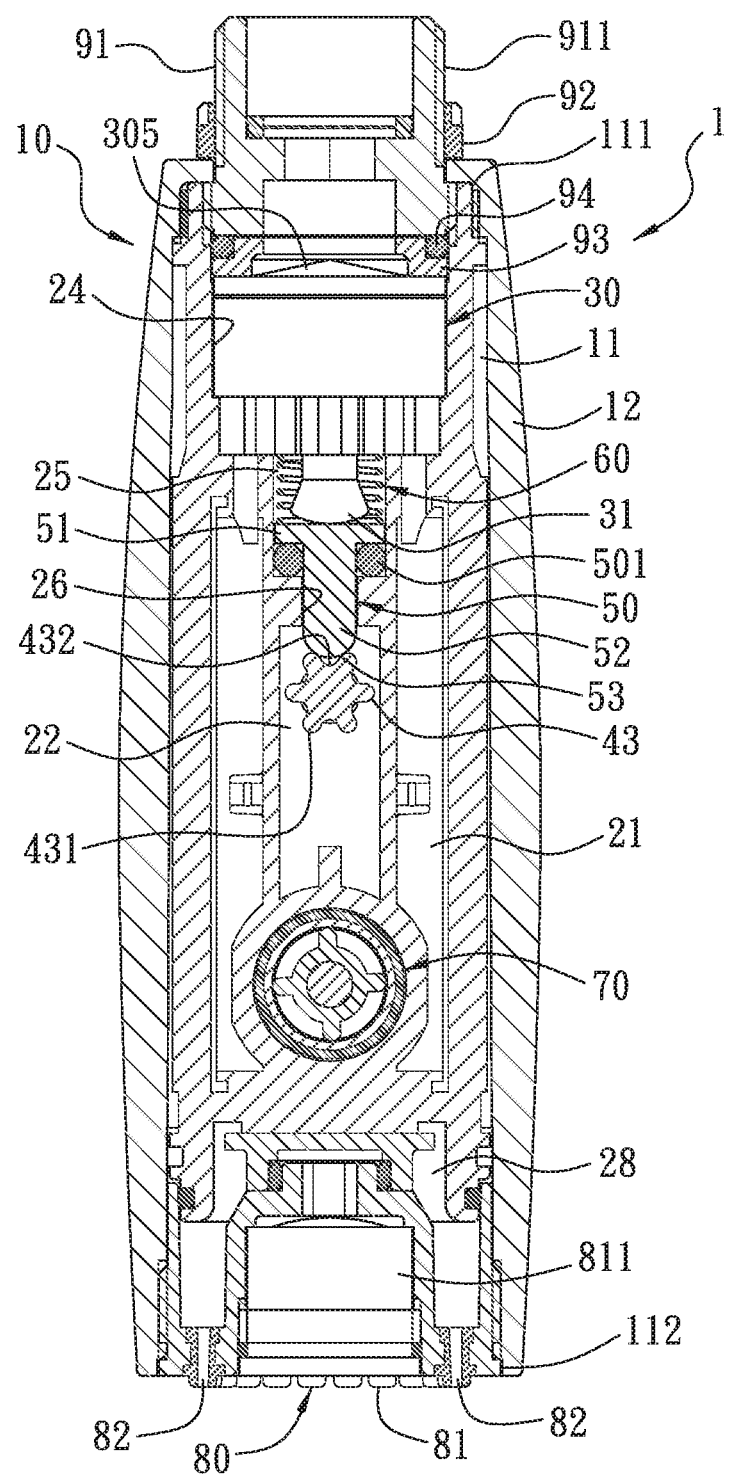
FIG. 4 is a cross-sectional view of an embodiment of a faucet head, taken along line 2-2 of FIG. 2.
Figure 5:
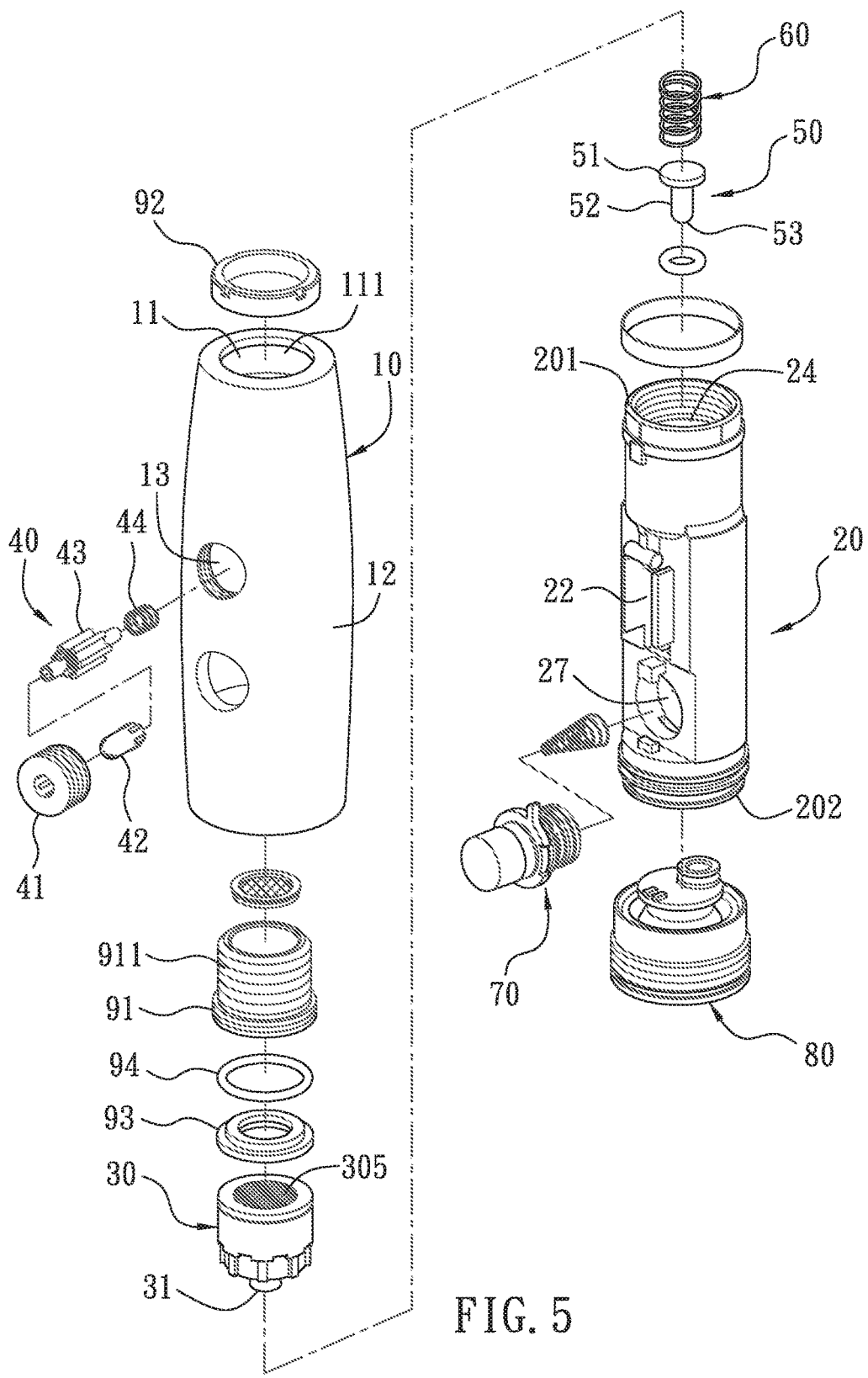
FIG. 5 is an exploded-view diagram illustrating an embodiment of a faucet head consistent with the present invention.

Referring to FIGS. 3-5, faucet head 1 can include an outer casing 10, a chamber 11, a water valve 30, and a push member 40. In some embodiments, chamber 11 may be an opening provided within faucet head 1 (or within outer casing 10), and faucet head 1 may provide chamber 11 therein, such as through a uni-body construction or a multiple-part construction. With a uni-body or integrated construction, a substantially-cylindrical space (cylinder) 20 within outer casing 10 may serve as a portion of chamber 11. Outer casing 10 can be manually operated by user, such as for holding and/or pulling faucet head 1, and can include chamber 11. Chamber 11 can be configured to be within faucet head 1 and include a first end 111 and a second end 112. First end 111 of chamber 11 can provide a water inlet coupled with water hose 2, and second end 112 of chamber 11 can provide a water and air outlet to discharge a mixture of water-and-air flow near second end 112 of chamber 11. First end 111 of chamber 11 can be coupled, in a dismountable manner, to second end 402 of faucet base 4.

For example, faucet head 1 can be dismountable from second end 402 of faucet base 4 while remaining coupled to water hose 2 to direct a mixture of water-and-air flow to a location away from faucet base 4 and to be relocated back to second end 402 of faucet base 4 to discharge the mixture of water-and-air flow while being coupled to faucet base 4.

Figure 6:
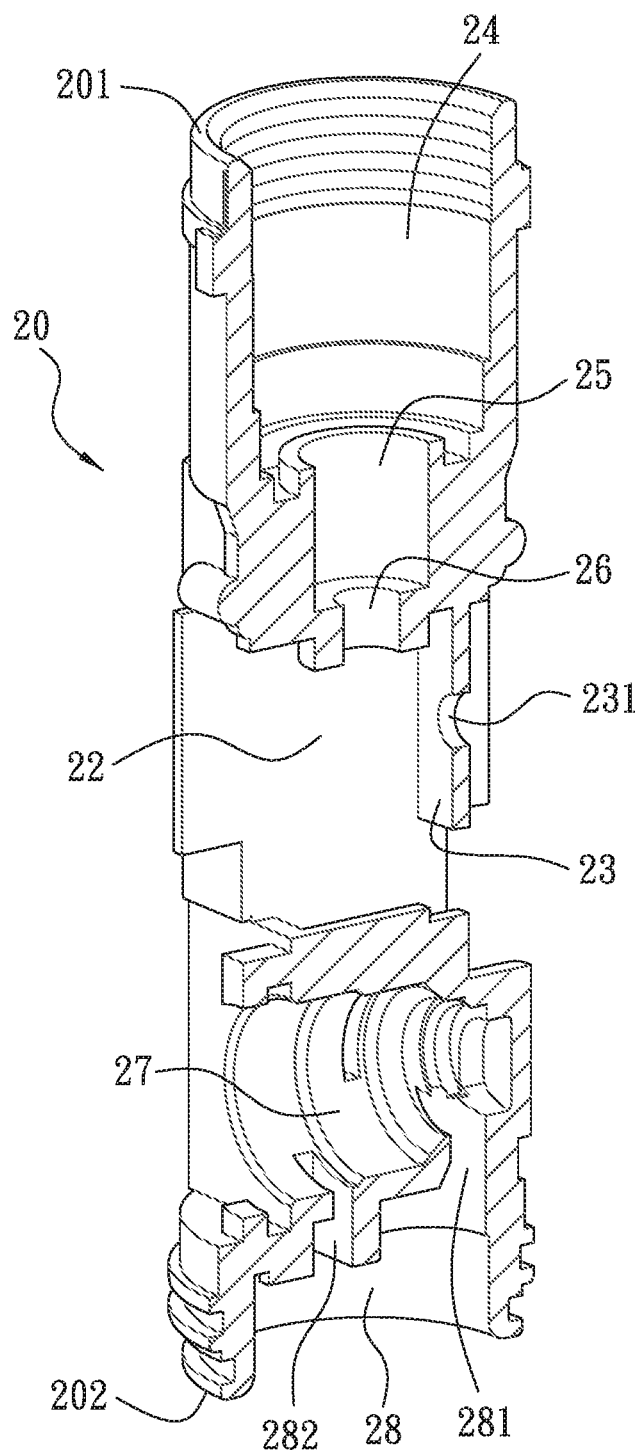
FIG. 6 is a perspective-section diagram illustrating an embodiment of a portion of a chamber in a faucet head consistent with the present invention.
Figure 7:
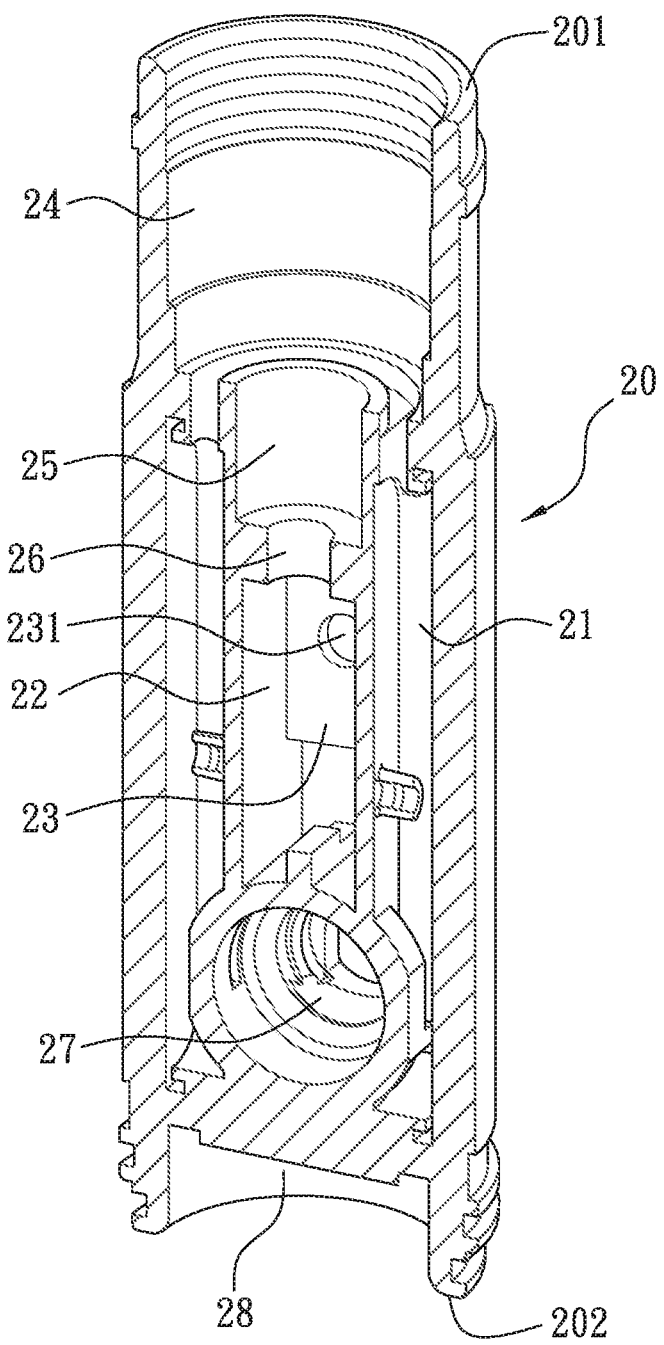
FIG. 7 is another perspective-section diagram illustrating an embodiment of a portion of a chamber in a faucet head consistent with the present invention.

Referring to FIGS. 3-7, cylinder 20 can be housed in chamber 11 of outer casing 10 and can include an inlet segment 201 communicating with water conduit 2b of water hose 2 via an inflow connector 91 (see FIGS. 1 and 2), an outlet segment 202, at least one first orifice 21, a second orifice 22, and a wall 23 adjacent to second orifice 22. As shown in FIGS. 6-7, first orifice 21, second orifice 22, and wall 23 can be defined between inlet segment 201 and outlet segment 202.

Figure 19:
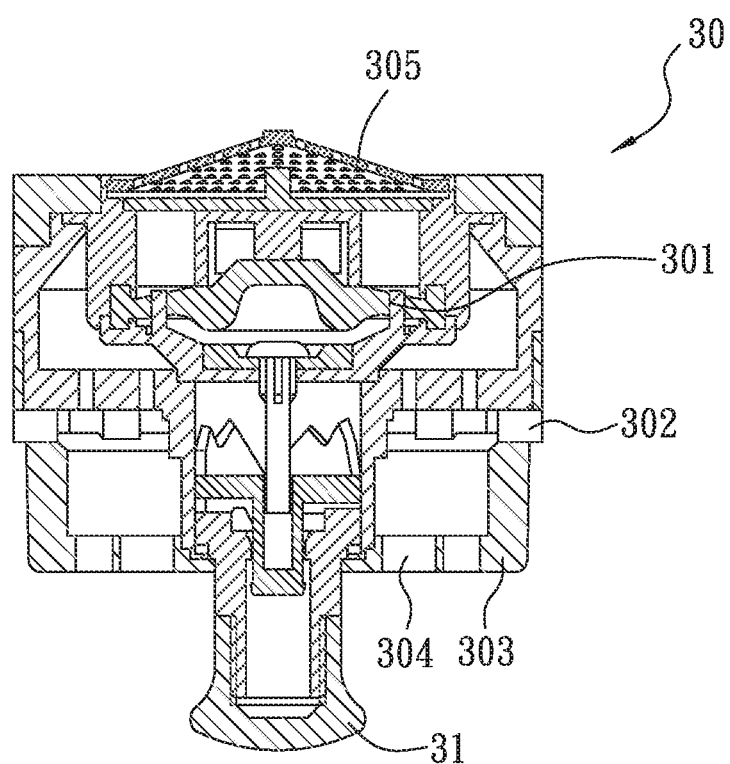
FIG. 19 is a cross-sectional view illustrating an embodiment of a water valve consistent with the present invention.

Water valve 30 can be positioned within chamber 11 and located between first end 111 and second end 112 of chamber 11. Water valve 30 can be accommodated in cylinder 20. Referring to FIG. 19, water valve 30 can include one or more air inlets 302 and a water inlet 305 to enable mixing air from air inlets 302 with water from water inlet 305. Air inlets 302 of water valve 30 can be coupled with chamber 11. Water inlet 305 can be coupled with water hose 2. Chamber 11 can include at least one air inlet at or near a side of faucet head 1 or second end 112 of chamber 11. The at least one air inlet of chamber 11 can be in communication with air inlets 302 of water valve 30 to enable the water valve's mixing of water and air. For example, an opening on faucet head 1 (or outer case 10) in communication with chamber 11 can serve as the air inlet of chamber 11 to supply air to water valve 30. An opening 13 of outer casing 10, as shown in FIG. 5 and will be described further below, can be adapted to communicate with and allow air intake to air inlets 302 of water valve 30. A side opening of faucet head 1 for accommodating a switch valve 70, as shown in FIG. 5 and will be described further below, can also be adapted to communicate with and allow air intake to air inlets 302 of water valve 30.

Alternatively or additionally, a center outlet 81 and/or a plurality of peripheral outlets 82, as shown in FIG. 4, can serve as an air inlet of chamber 11 to supply air to water valve 30. As will be described further below, center outlet 81 and peripheral outlets 82 can be adapted to communicate with chamber 11 to discharge a flow of the water-and-air mixture in a stream discharge mode and a spray discharge mode, respectively. When in the stream discharge mode, one or more peripheral outlets 82 can be adapted to communicate with and allow air intake to air inlets 302 of water valve 30. When in the spray discharge mode, center outlet 81 can be adapted to communicate with and allow air intake to air inlets 302 of water valve 30.

Water valve 30 can include a control valve 301 movable within water valve 30 between a first position and a second position. The first position can be a position that enables mixing air from air inlets 302 with water from water inlet 305 to provide a mixture of water-and-air flow. The second position can be a position that enables shut-off of a mixture of water-and-air flow. A direction of the movement of control valve 301 between the first position and the second position can be substantially parallel with a direction of a water flow (or a water-and-air flow) from first end 111 to second end 112 of chamber 11. Control valve 301 can be adapted to use a water pressure supplied by water hose 2 to facilitate an operation of control valve 301, either in one direction or in both directions.

Water valve 30 can be a water-pressure-assisted aerator with a control valve. In one embodiment and referring to FIG. 19, water valve 30 can contain a screen 303 coupled with control valve 301 and located downstream of control valve 301. Screen 303 can include a plurality of water passageways 304, with as little as two or four passageways to as many as a dozen or dozens of passageways. Water passageways 304 can be in communication with one or more air inlets 302 of water valve 30 to enable the water valve's mixing of water and air into a mixture of water-and-air flow. Air inlets 302 may have openings from the side, from the above, from the lower portion of water valve 30, or having the openings in any of the combinations. The air inlets may enable the faucet head and the chamber to be designed with flexibilities and with openings or gaps to enable air flow.

Referring to FIGS. 3-5, 16, and 19, control valve 301 can include a driving member 31 that protrudes out from one end of water valve 30, such as from a lower portion or the bottom of water valve 30. Driving member 31 can be engaged with and driven by push member 40 to control a position of control valve 301. For example, driving member 31 can be driven to move control valve 301, such as moving it up, to turn on water valve 30 so that water flows into at least one first orifice 21 of cylinder 20 from water conduit 2b of water hose 2 and into water inlet 305 of water valve 30. When control valve 301 is pushed up, it breaks the water-tight seal between control valve 301 and a lateral or internal wall of water valve 30 to cause the water from the connected water hose 2, through water conduit 2b, to flow through water inlet 305. Water inlet 305 may be equipped with a screen, a mesh, or some other debris- or particle-blocking design to avoid any debris or particle from entering the water-tight seal of control valve 301, which may cause it to lead or malfunction. When control valve 301 is lowered, it returns to its water-tight seal state, and the control valve 301 may be designed with surface(s) onto which water pressure may exert additional force to reinforce the water-tight seal between control valve 301 and an internal wall of water valve 30. The seal between control valve 301 and water valve 30 may be formed with rubber, resin, or other suitable sealing materials.

In one embodiment, the control valve may be coupled or equipped with a spring and a cam that moves or locks control valve in two or more different positions each time the driving member 31 is pressed. The design or operation may be similar to or a variation of those used in retractable/clicking pens. U.S. Pat. No. 3,819,282 discloses one example of such design. In one embodiment of control valve 301, a second/resting position can provide a water-tight seal and stop water flow. A first position can open the seal between control valve 301 and internal wall(s) of water valve 30, and the opening enables the water flow. A third position or additional positions are optional, and when used, it/they may keep the seal open, but modulate the water flow by providing a bigger (or smaller) gap(s) to provide more (or less) water flow than the water flow at the first position.

Driving member 31 can include a pin, rod, stem, tube, or an elongated structure protruding out of water valve 30. Driving member 31 can include a head for coupling with push member 40 and a body connected to the head for transmitting force and/or motion.

With reference to FIGS. 3-5 and 16, faucet head 1 can include a pin 50 extending out of a cavity 25 from a through hole 26 to engage with push member 40 so that push member 40 can actuate driving member 31 via pin 50. Pin 50 can include a head 51 for sliding upward and downward in cavity 25, a body 52 extending from head 51 and extending out of through hole 26 from head 51, and a tip 53 for engaging with push member 40. Head 51 can be configured to contact with and drive driving member 31 of water valve 30. Tip 53 can be at a distal end of the body 52 and have a smooth contour for engaging with push member 40.

As illustrated in FIGS. 3-16, push member 40 can be movably coupled with faucet head 1 at or near a side of faucet head 1 (or outer casing 10), to enable an operation of control valve 301 within water valve 30. Push member 40 can include a seat 41, a plunger 42, and a rotating device 43. An operation of push member 40 may occur by pressing plunger 42 from or near a side of faucet head 1 to cause rotating device 43 to rotate relative to plunger 42. A rotation of rotating device 43 can cause control valve 301 to move between the first position and the second position. As will be further explained below, push member 40 can include a push-to-rotate member.

In one embodiment, as shown in FIGS. 8-18, seat 41 can be shaped as a tube or a ring having a first end 4101, a second end 4102, an outer surface 4110, and an inner surface 4111. A through hole 411 can be formed in seat 41 and extend between first end 4101 and second end 4102 in a direction of a center axis of seat 41. Through hole 411 can be defined by inner surface 4111 and can be adapted for insertion of plunger 42. Inner surface 4111 can include surface features for engaging with plunger 42 and rotating device 43. Inner surface 4111 can include a plurality of grooves 412 and a plurality of teeth 413. Grooves 412 and teeth 413 can extend in a direction parallel to the center axis of seat 41. Grooves 412 and teeth 413 can be arranged alternately in a circumferential direction of through hole 411 such that a groove 412 can be provided adjacent to two teeth 413 while a tooth 413 can be provided adjacent to two grooves 412.

In this embodiment, inner surface 4111 of seat 41 can include six grooves 412 and six teeth 413. Six grooves 412 can include three grooves 412a, each having a first depth from inner surface 4111, and three grooves 412b, each having a second depth from inner surface 4111. The first depth can be deeper than the second depth. As described herein, grooves 412a may be referred to as "deep grooves," and grooves 412b may be referred to as "shallow grooves." Grooves 412a and 412b can be arranged alternately in the circumferential direction of through hole 411.

Figure 18:
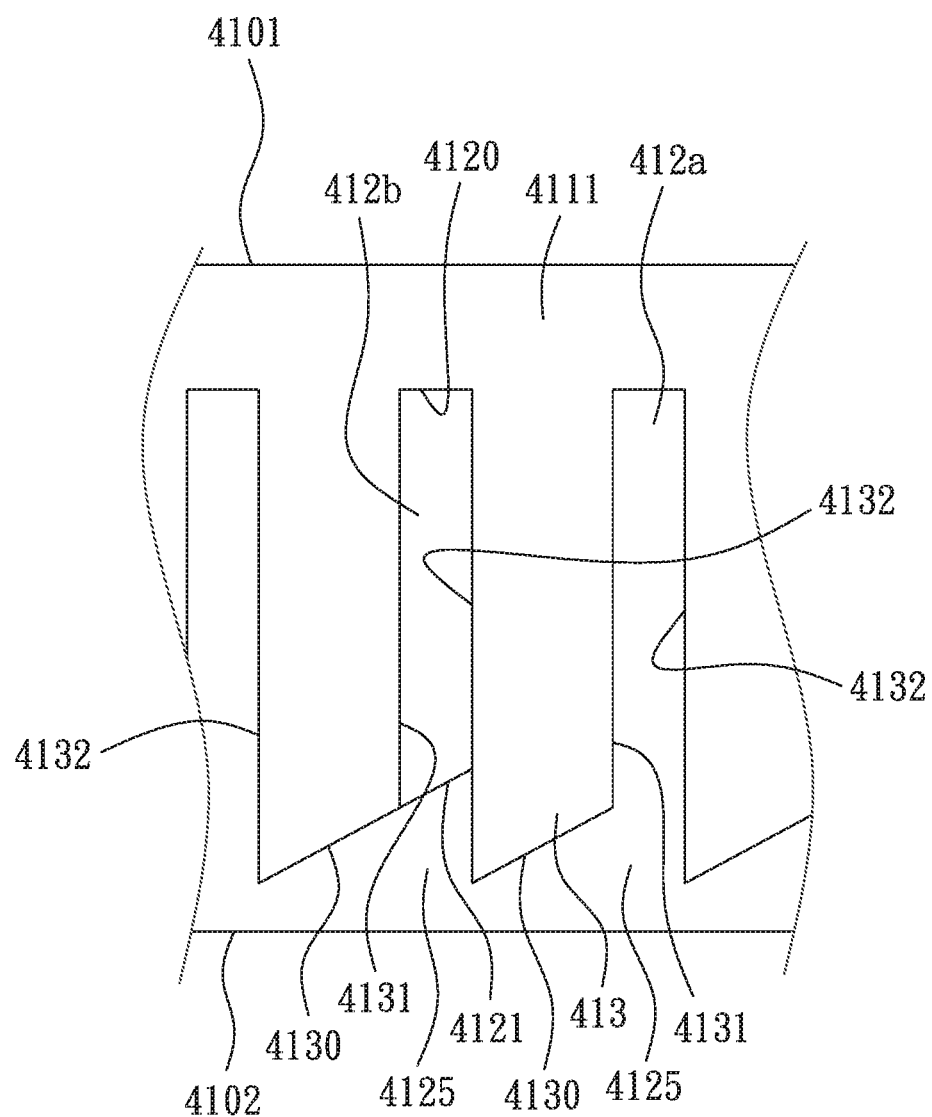
FIG. 18 is an illustration of a portion of a seat, when flattened, consistent with the present invention.

As shown in FIG. 18, which depicts a portion of an inner surface 4111 of seat 41 when the surface is flattened, a groove 412 (412a or 412b) can have an opening to one side and have sides of unequal lengths, with each side extending in a direction parallel to the center axis of seat 41. With the opening opened toward the lower part of FIG. 18, the sides of a groove 412 can be defined between an open end (in the lower half of FIG. 18) and a closed end (near the upper half of FIG. 18) of the groove. For example, groove 412 can be closed-ended at one end towards first end 4101 of seat 41 and open-ended at the other end towards second end 4102 of seat 41. Two teeth 413 can be spaced apart from each other by one groove 412a or 412b and can be joined at a location towards first end 4101 to form a closed end 4120 of the groove. Each tooth 413 can have a tapered end 4130 forming an angle with a side 4131 or 4132 of the tooth, and each of the sides extends in a direction parallel to the center axis of seat 41. All ends of teeth 413 can be tapered, and all of the ends can be tapered with the same angle. Tapered end 4130 can be joined by sides 4131 and 4132 of the tooth. For a tapered tooth 413, side 4131 can be shorter than side 4132. Thus, side 4131 of a tooth 413 can form a shorter side of a groove 412a, while side 4131 of an adjacent tooth 413 can form a longer side of a groove 412b. Side 4132 of a tooth 413 can form a longer side of a groove 412a, while side 4132 of an adjacent tooth 413 can form a shorter side of a groove 412b and extend from the open end of the groove towards second end 4102 of seat 41.

Figure 8:
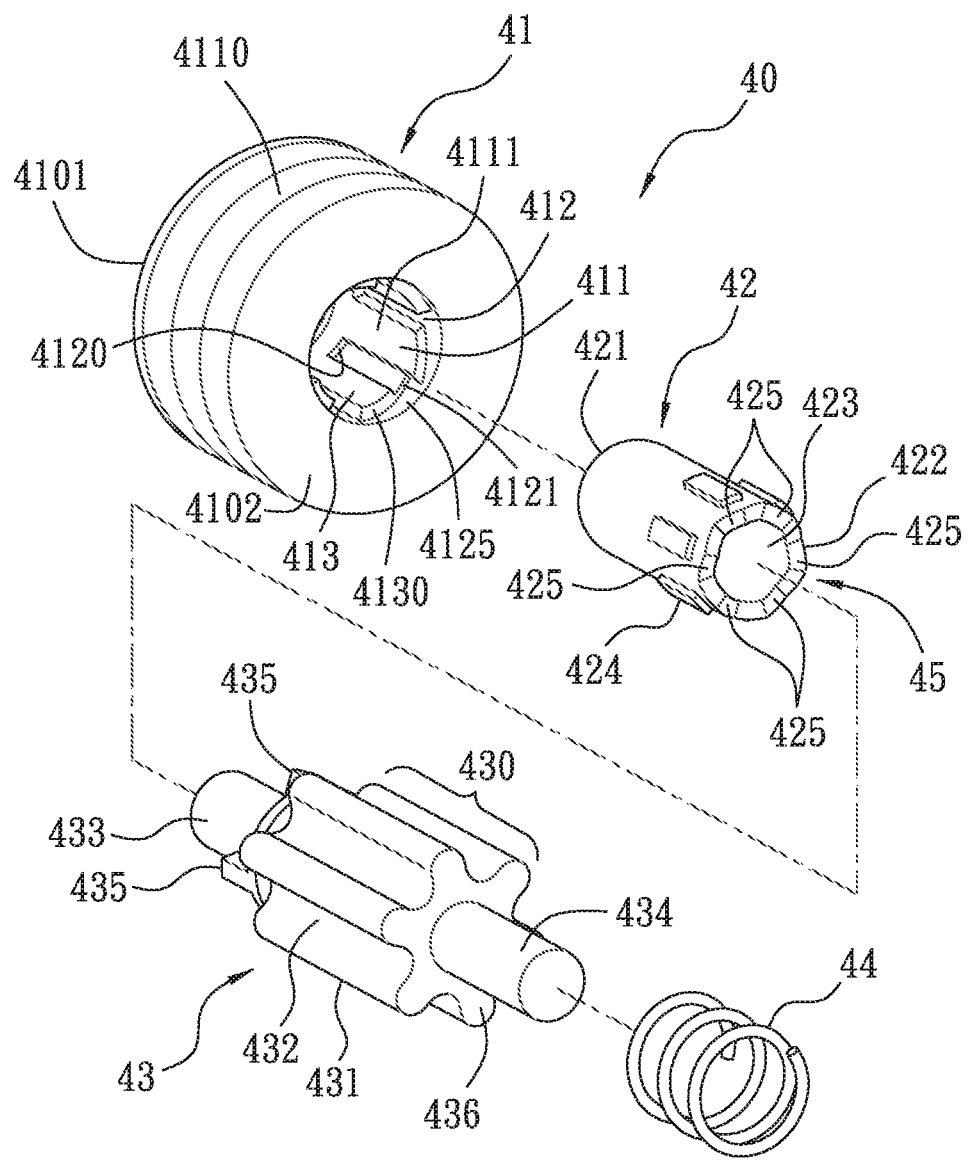
FIG. 8 is an exploded diagram illustrating an embodiment of a push member consistent with the present invention.
Figure 12:
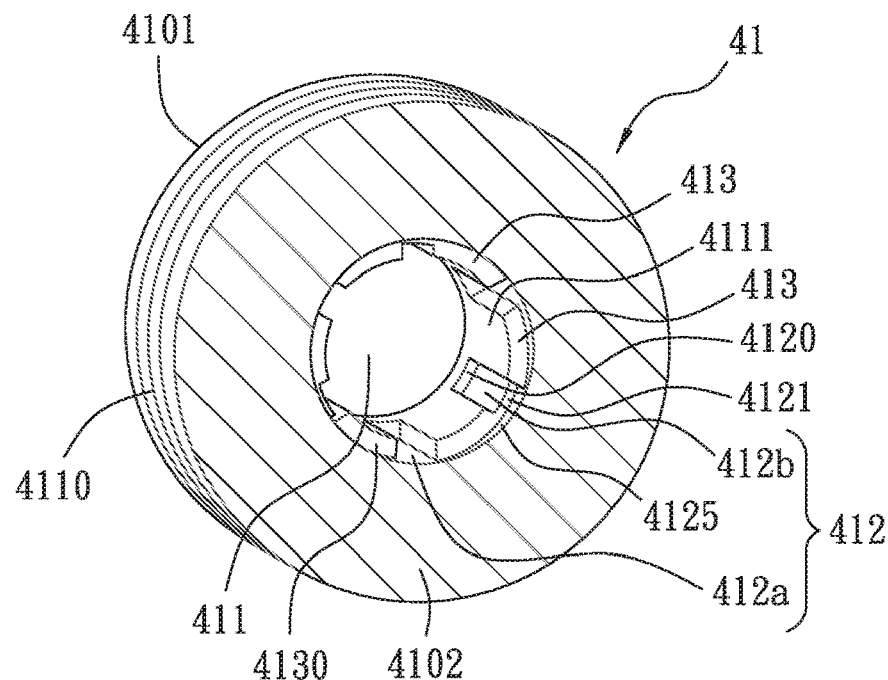
FIG. 12 is a perspective view illustrating an embodiment of a seat consistent with the present invention.

As also shown in FIGS. 8, 12, and 18, a channel 4125 can be formed to spatially communicate with a groove 412a or 412b through the open end of the groove. Channel 4125 can be formed near second end 4102 of seat 41 and at least partially defined by end 4130 of a tooth 413 adjacent to that groove 412a or 412b. As shown in FIG. 18, a channel 4125 can be formed to spatially communicate with other channels 4125 in inner surface 4111, but this is not necessary. Tips of teeth 413 can extend to second end 4102, and multiple channels 4125 can be substantially separated by teeth 413 in inner surface 4111. As will be explained below, a channel 4125 allows a corresponding tooth 435 of rotating device 43 to traverse along end 4130 of teeth 413 towards the open end of the groove.

In addition, a channel 4125 adjacent to a deep groove 412a can have the same depth as the groove 412a (e.g., the first depth). A channel 4125 adjacent to a shallow groove 412b can also have the same depth as the first depth, but when the second depth of groove 412b is less than the first depth, an end 4121 can be formed in the form of a step to bridge the depth difference between groove 412b and channel 4125. End 4121 adjacent a groove 412b can be formed by extending from end 4130 of one tooth 413 in the same tapering angle as end 4130 to the other tooth 413 adjacent to the same groove. Thus, a tooth 435 of rotating device 43 can be prevented from moving into groove 412b due to the presence of end 4121.

Plunger 42 can include a generally cylindrical body to be inserted into and movable in through hole 411. Plunger 42 can include a nose 421 at one end and an opening 423 at the other end. Opening 423 can be surrounded by a sleeve 422, which can extend from the body. Sleeve 422 can include a plurality of teeth 425 for engaging with rotating device 43. Teeth 425 can have tapered ends. Plunger 42 can further include a plurality of lugs 424 for engaging with grooves 412 of seat 41. Lugs 424 can be raised from an outer surface of plunger 42 near sleeve 422. Lugs 424 can have a length shorter than grooves 412 of seat 41 so that they can be movable along a length of grooves 412. In this embodiment, six lugs 424 can be provided to engage with six grooves 412 of seat 41.

Rotating device 43 can include a first shaft 433, a second shaft 434, and a rotor 430 positioned between first shaft 433 and second shaft 434. Rotating device 43 can be integrally formed or formed from various parts. For example, first shaft 433 and second shaft 434 can be replaced with a single shaft, which can be inserted through a hollow rotor. Rotor 430, first shaft 433, and second shaft 434 can be coaxially arranged and rotatable about a center axis as a whole. First shaft 433 can be dimensioned to be inserted into and rotatable within opening 423 of plunger 42. Second shaft 434 can be dimensioned to be inserted into and rotatable within a hole in cylinder 20 of faucet head, as will be further explained below.

Figure 9:
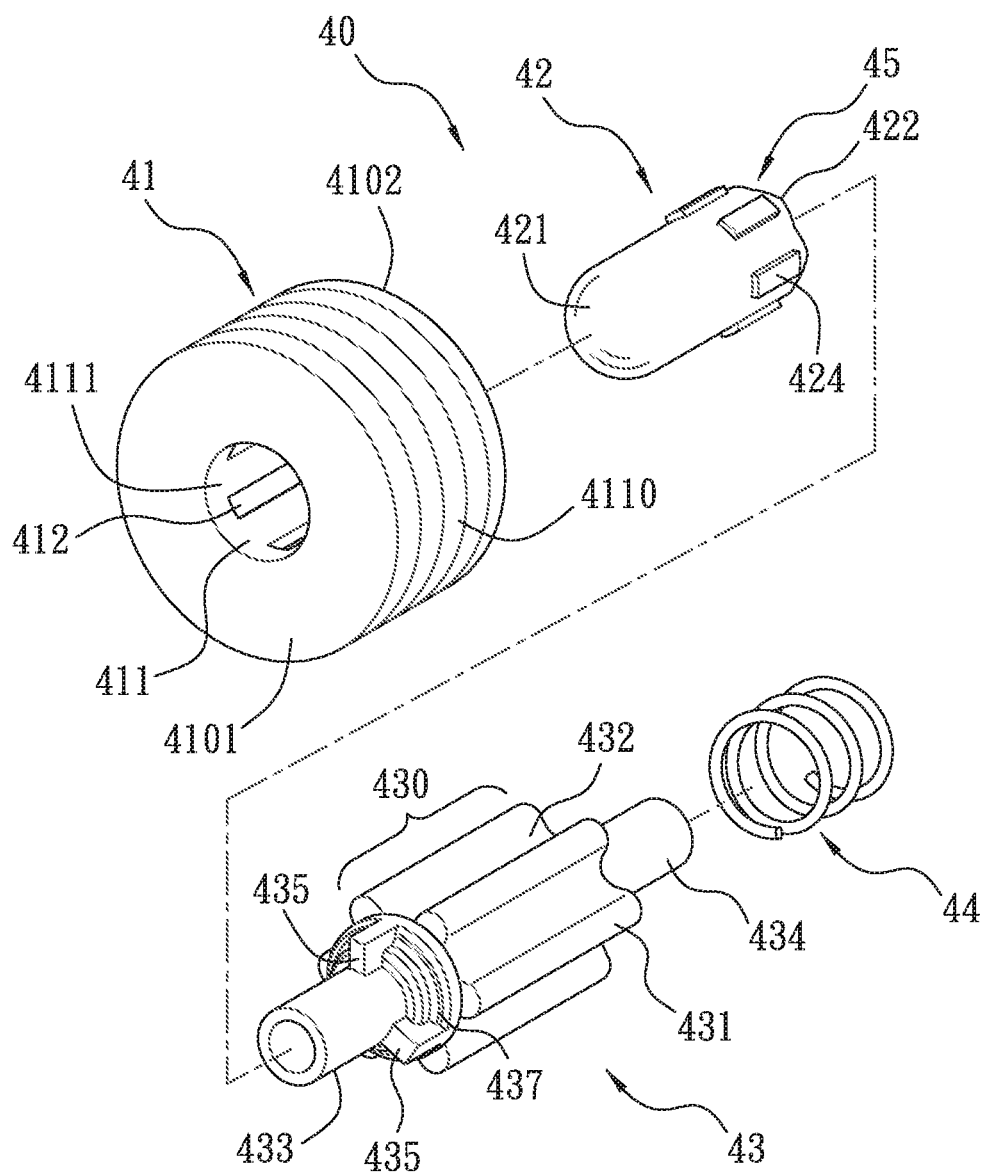
FIG. 9 is another exploded diagram illustrating an embodiment of a push member consistent with the present invention.

Rotating device 43 can further include a plurality of teeth 435 positioned around a portion of first shaft 433 near rotor 430 for engaging with plunger 42 and seat 41. Teeth 435 can have tapered ends for engaging with teeth 425 of plunger 42 and various features of inner surface 4111 (e.g., grooves 412a, ends 4121, channels 4125, and teeth 413) of seat 41. Teeth 435 can be evenly spaced apart from each other in a circumferential direction of rotating device 43. In this embodiment, three teeth 435 can be provided, each being angularly positioned from the adjacent teeth by 120 degrees. Each of teeth 435 can be angularly positioned to correspond to, or angularly aligned with, a second region 432 of rotor 430, as shown in FIG. 9 and will be further explained below. In addition, fringes 437 can be provided between teeth 435 for engaging with teeth 413 of seat 41. A fringe 437 can be formed into a generally arc shape connecting two teeth 435 and having a stepped surface as shown in FIG. 9.

Figure 17:
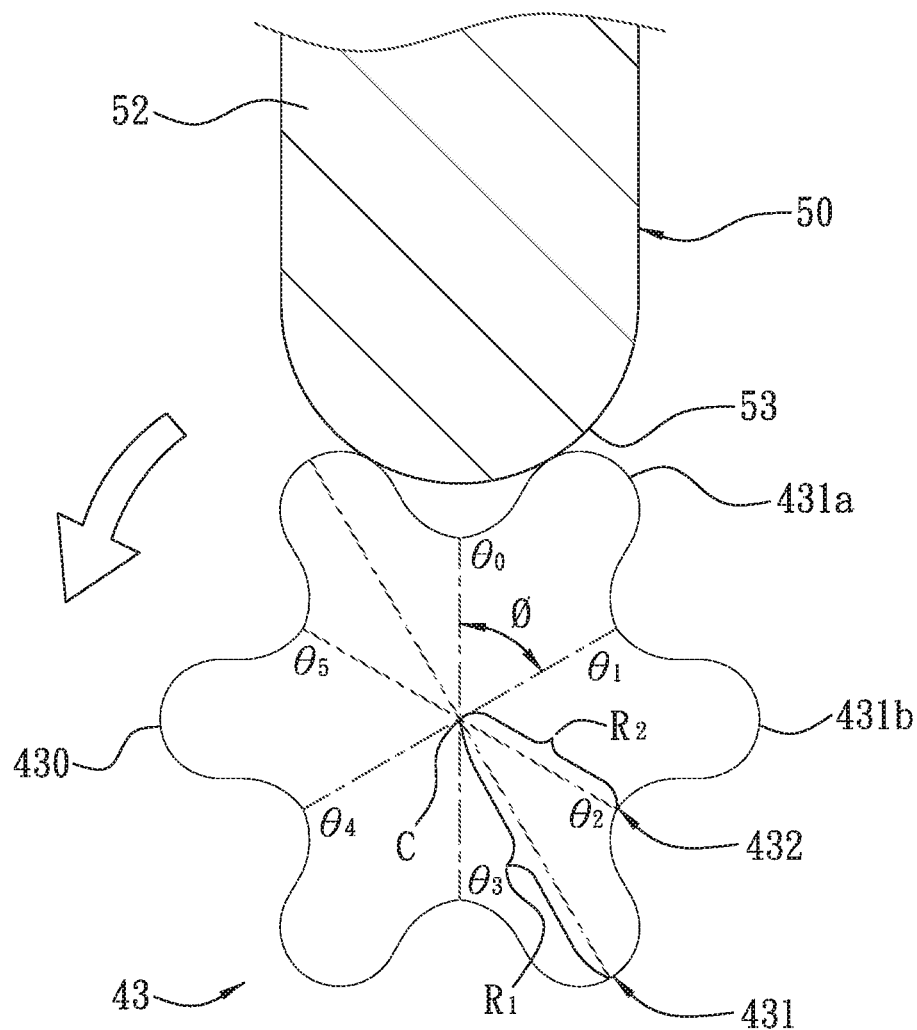
FIG. 17 is a cross-sectional view illustrating an embodiment of a portion of a push member consistent with the present invention.

Rotor 430 can have a generally rounded outer shape or profile with regions of different radii. As shown in FIGS. 8, 9, and 17, rotor 430 can include a plurality of first regions 431, each having a first radius $R_1$ from a center (or center axis) C of rotor 430, and a plurality of second regions 432, each having a second radius $R_2$ from center C of rotor 430 first radius, first radius $R_1$ being greater than second radius $R_2$. As seen from FIG. 17, which shows a cross section of rotor 430, first regions 431 can have a curved or wavy contour for enabling an engagement between rotor 430 and a pin 50 or driving member 31 of water valve 40. A first region 431 can include a peak protruding away from center axis C of rotor 430, and a second region 432 can include a valley situated between the peaks of two adjacent first regions 431. A radius measured from the peak to center C can be referred to as a peak radius, and a radius measured from the valley to center C can be referred to as a valley radius. A sufficient difference between first radius $R_1$ and second radius $R_2$ can be configured to enable an operation of push device 40 with control valve 301 of water valve 30. For example, a difference between a peak radius and valley radius should be sufficiently large to enable a movement of control valve 301 between the first and second positions when rotating device 43 operates as described herein. Rotor 430 can also include transitional regions between first regions 431 and second regions 432. A transitional region can include a region that is between the peak of an adjacent first region 431 and a valley of an adjacent second region 432.

As shown in FIG. 17, rotor 430 can include six first regions 431 and six second regions 432 alternately arranged in a circumferential direction of rotor 430. However, the number of the first or second region is not limited and can depend on the specific designs of the push member 40, water valve 30, control valve 301, and/or pin 50. Moreover, more than two types of regions and/or more than one type of peak or valley radius of a region can be configured for the rotor. For example, a plurality of third regions of a different radius than the first and second radii may be provided between the first and second regions. The first regions may have peaks of different radii so that adjacent peaks or different peaks do not have the same radius. Different peak radii can cause different movements of control valve 301 and/or pin 50 when control valve 301 can be configured to include a third position, for example.

In the assembly of push member 40, plunger 42 can be inserted into through hole 411 with six lugs 424 of plunger 42 engaging with six grooves 412 of seat 41, respectively. The movement of lugs 424 in grooves 412 can be confined by sides of grooves 412 such that plunger 42 can be prevented from rotating relative to seat 41 and restricted to only move or slide relative to seat 41 in the direction of the center axis of seat 41. The movement of lugs 424 can additionally be limited by ends 4120 of grooves 412 such that plunger 42 can be prevented from being separated from seat 41 from first end 4101. First shaft 433 of rotating device 43 can be inserted into opening 423 of plunger 42 with teeth 435 of rotating device 43 being engaged with one or more of teeth 425 of plunger 42 and/or one or more of the surface features of inner surface 4111 of seat 41 such as grooves 412a, ends 4121, channels 4125, and teeth 413. Rotating device 43 can be moved relative to seat 41 or plunger 42 longitudinally (i.e., in the direction of the center axis of seat 41 or plunger 42). Rotating device 43 can also be rotatable with respect to seat 41 or plunger 42.

As shown in FIGS. 3 and 5-7, a portion of push member 40 can be accommodated in second orifice 22 of cylinder 20 in chamber 11. Seat 41 can be positioned in opening 13 of outer casing 10 and fixed thereto. Plunger 42 can be adapted to protrude sufficiently from seat 41 and outer casing 10 for operation by the user. Second shaft 434 of rotating device 43 can be rotatably inserted into a hole 231 in wall 23 of cylinder 20. As also shown in FIGS. 8 and 9, a spring 44 can be provided around second shaft 434 and between wall 23 and an end 236 of rotor 430 to exert a force against rotor 430 towards seat 41. Spring 44 can be a compression spring configured to constantly exert a force on rotor 430.

Figure 14:
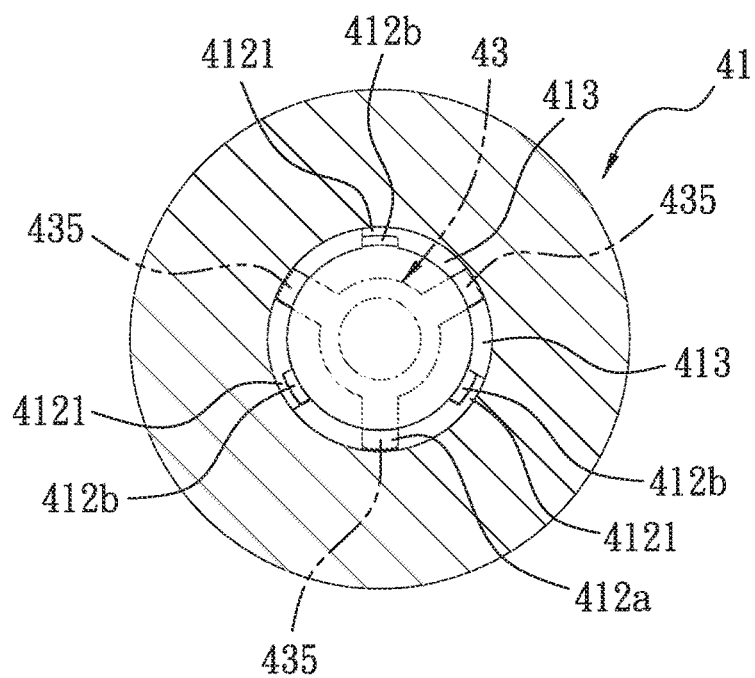
FIG. 14 is another end view illustrating an embodiment of a push member consistent with the present invention.
Figure 15:
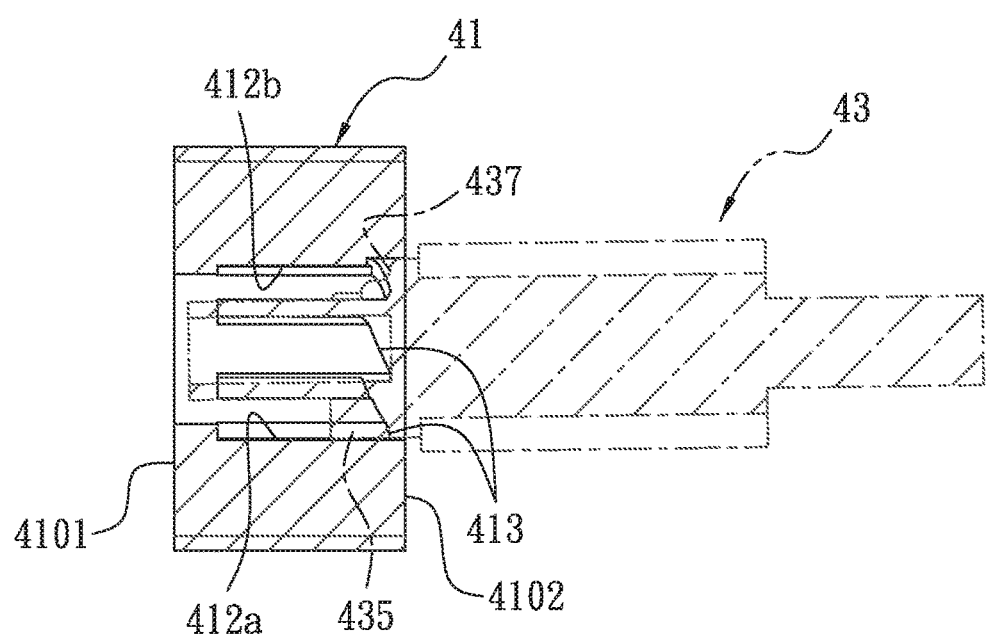
FIG. 15 is a cross-sectional view illustrating an embodiment of a portion of a push member consistent with the present invention.

Push member 40 can be operated between a first position and a second position via one transitional position. In either a first or second position, teeth 435 of rotating device 43 can engage with either ends 4121 or grooves 412a of seat 41. In some examples, by observing the operation of push member 40, the first or second position can be considered as a stable position, and the transitional position can be considered as a non-stable position. In a first position, as shown in FIGS. 14 and 15, teeth 435 can engage with grooves 412a of seat 41. Teeth 435 can be inserted into grooves 412a and longitudinally movable in the grooves in the direction of the center axis of seat 41. Teeth 435 can tend to move towards closed ends 4120 of grooves 412a under the urging of spring 44, but fringes 437 of rotating device 43 can come into contact with ends 4130 of teeth 413 of seat 41 to limit the movement of rotating device 43. Specifically, tips of ends 4130 near second end 4102 of seat 41 can stop the movement of rotating device 43 towards ends 4120 by contacting with and urging against fringes 437 of rotating device 43. Moreover, when teeth 435 are engaged with grooves 412a, rotor 430 can be in an orientation engaging with pin 50 such that tip 53 of pin 50 is in contact with two first regions 431 of rotor 430, as shown in FIG. 17.

Figure 10:
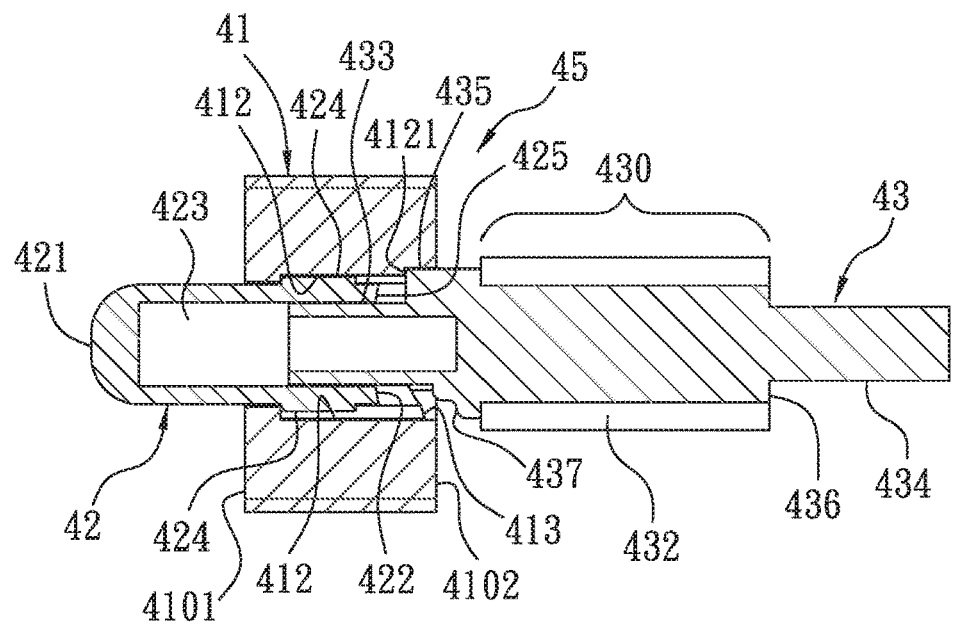
FIG. 10 is a cross-sectional view of an embodiment of a push member consistent with the present invention.
Figure 11:
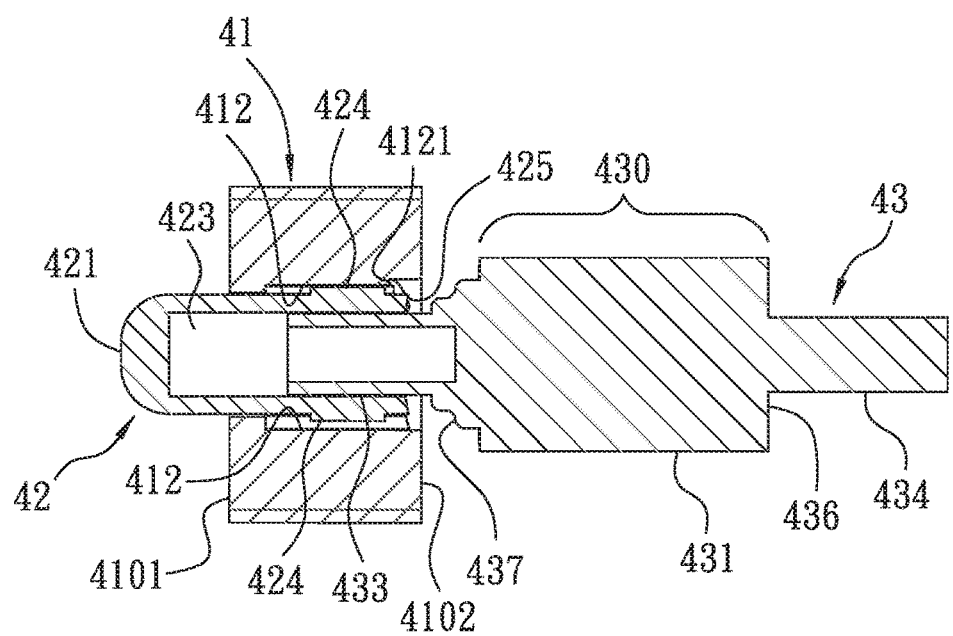
FIG. 11 is another cross-sectional view of an embodiment of a push member consistent with the present invention.
Figure 13:
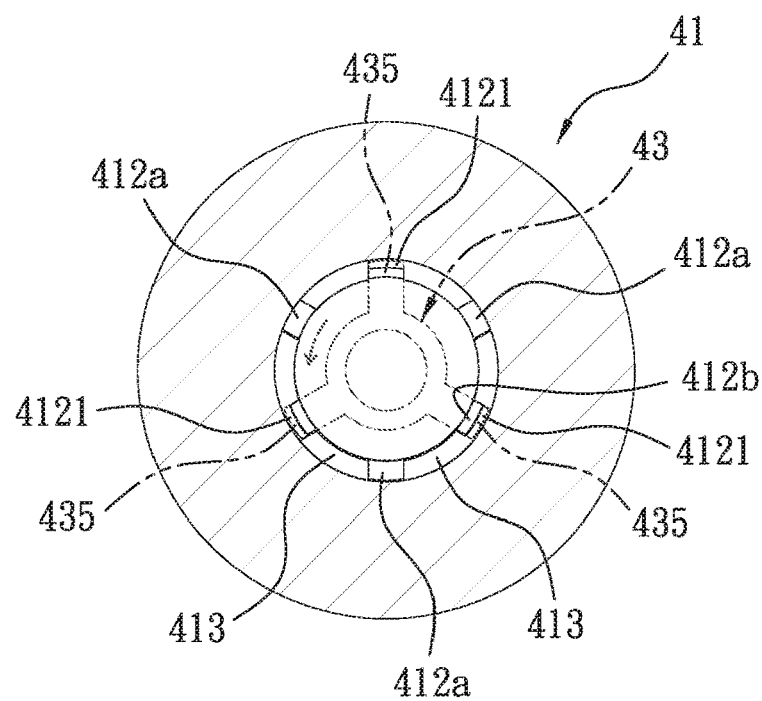
FIG. 13 is an end view illustrating an embodiment of a push member consistent with the present invention.

In a second position, as shown in FIGS. 3, 10, 13, teeth 435 can engage with ends 4121 adjacent to the open ends of shallow grooves 412b. Teeth 435 can be urged against ends 4121 by the force of spring 44, and at the same time, the longer side 4132 of the adjacent tooth 413 can prevent teeth 435 from traversing beyond end 4121. When teeth 435 are engaged with ends 4121 (and the longer side 4132 of the adjacent tooth 413), rotor 430 can also be in an orientation engaging with pin 50 such that tip 53 of pin 50 is in contact with two first regions 431 of rotor 430, as shown in FIG. 17.

In the transitional position, push member 40 can be either moving from the first position to the second position or moving from the second position to the first position. When push member 40 is in the first position and a user presses the plunger 42, plunger 42 can move or slide in the direction of the center axis of the seat 41 towards second end 4102 of seat 41. Lugs 424 of plunger 42 can slide in grooves 412 towards the open ends of grooves 412. As plunger 42 moves towards the open ends of grooves 412, teeth 425 of plunger 42 can drive teeth 435 of rotating device 43 in the direction of the center axis of the seat 41 away from seat 41. In some examples, pressing plunger 42 can bring teeth 425 to first come into contact with teeth 435 if teeth 425 are not already in contact with teeth 435. As a result, teeth 435 can be driven along grooves 412a and exit grooves 412a to disengage from teeth 413. Specifically, a tip of a tooth 435 can be moved in a groove 412a so that it moves passed a tip of the longer side 4132 of a tooth 413 adjacent to the groove. Namely, a tooth 435 can come off from the end of the longer side 4132 of the adjacent tooth 413 and become free of the restriction of the longer side 4132. At this moment, the user can release plunger 42, and since rotating device 43 now becomes free to rotate relative to plunger 42, teeth 435 of rotating device 43 can begin moving off teeth 425 of plunger 42 in the tapering direction of teeth 425 and engage with ends 4130 of the adjacent teeth 413 because of the urging of spring 44 on rotating device 43 towards first end 4101 of seat 41. Thus, rotating device 43 can rotate relative to plunger 42 as teeth 435 move off the tapered ends of teeth 425 and engage with ends 4130 of the adjacent teeth 413. Rotating device 43 can continue to rotate relative to plunger 42 as teeth 435 move in channels 4125 along ends 4130 and engage with ends 4121 adjacent to grooves 412b. Rotating device 43 can come to a stop as the longitudinal movement of teeth 435 becomes limited by ends 4121 and the traversal of teeth 435 along the tapered ends 4130 and 4121 becomes limited by the longer sides 4132 of the adjacent teeth 413. As a result, rotating device 43 can move into and remain stationary in this position. Namely, push member 40 can move into the second position.

When push member 40 is in the second position and a user presses the plunger 42, plunger 42 can move or slide in the direction of the center axis of the seat 41 towards second end 4102 of seat 41. Lugs 424 of plunger 42 can slide in grooves 412 towards the open ends of grooves 412. As plunger 42 moves towards the open ends of grooves 412, teeth 425 of plunger 42 can drive teeth 435 of rotating device 43 in the direction of the center axis of the seat 41 away from seat 41. In some examples, pressing plunger 42 can bring teeth 425 to first come into contact with teeth 435 if teeth 425 are not already in contact with teeth 435. Teeth 435 can be driven along the longer sides 4132 of the adjacent teeth 413 to first disengage from ends 4121 and then disengage from the adjacent teeth 413. Specifically, a tip of a tooth 435 can be moved passed a tip of the adjacent tooth 413. Namely, a tooth 435 can come off from the end of the longer side 4132 of the adjacent tooth 413 and become free of the restriction of the longer side 4132. At this moment, the user can release plunger 42, and since rotating device 43 now becomes free to rotate relative to plunger 42, teeth 435 of rotating device 43 can begin moving off teeth 425 of plunger 42 in the tapering direction of teeth 425 and engage with ends 4130 of the adjacent teeth 413 because of the urging of spring 44 on rotating device 43 towards first end 4101 of seat 41. Thus, rotating device 43 can rotate relative to plunger 42 as teeth 435 move off the tapered ends of teeth 425 and engage with ends 4130 of the adjacent teeth 413. Rotating device 43 can continue to rotate relative to plunger 42 as teeth 435 move in channels 4125 along ends 4130 and then slide into grooves 412a. Teeth 435 can move towards first end 4101 of seat 41 in grooves 412a until fringes 437 come in contact with and are urged against tips of ends 4130 of teeth 413. As a result, rotating device 43 can move into and remain stationary in this position. Namely, push member 40 can move into the first position.

FIG. 17 is a cross sectional view showing the engagement of rotor 430 with pin 50 in a position of push member 40. FIG. 17 can represent either the first or second position. Rotor 430 is shown to have six angular positions denoted by $\theta_0$ to $\theta_5$, which correspond to positions of six second regions 432. Tip 53 of pin 50 can be engaged with two first regions 431 and opposed to a second region 432 at angular position $\theta_0$ between the two first regions. When push member 40 moves from the first position to the second position or from the second position to the first position, rotor 430 will rotate from angular position $\theta_0$ to angular position $\theta_1$ in the counterclockwise direction as indicated by the arrow shown in FIG. 17. The amount of rotation is indicated as $\Phi$, which equals to 60 degrees in this example.

Assuming FIG. 17 shows that second regions 432 with angular positions $\theta_0$, $\theta_2$, and $\theta_4$ correspond to, or are angularly aligned with, teeth 435, and that teeth 435 are currently engaged with grooves 412a of plunger 42, indicating that push member 40 is in the first position before operation, pressing and releasing plunger 42 will cause rotor 430 to rotate by one $\Phi$, or 60 degrees, from angular position $\theta_0$ to angular position $\theta_1$ in the counterclockwise direction. The rotation of rotor 430 can cause a first region 431*a*, which is one of the two first regions currently engaging with pin 50, to exert a force on tip 53 of pin 50 to push or urge pin 50 upwards. Pin 50 can be pushed upwards to a highest position relative to center C of rotor 430 when pin 50 contacts the peak (or a location near the peak) of first region 431*a*. Then, pin 50 is moved down once it passes the peak of first region 431*a*. Once first region 431*a* rotates by one full Φ, pin 50 is engaged with first regions 431*a* and 431*b* and remains opposed to the second region 432 with angular position $\theta_1$. Thus, push member 40 is now in the second position.

When plunger 42 is operated again by pressing and releasing, rotor 430 will rotate to cause pin 50 to undergo an up-down movement as described above, but with the upward movement of pin 50 caused by the profile of first region 431*b*, before rotor 430 settles into angular position $\theta_2$. Thus, push member 40 is moved into the first position again.

It can be understood that rotor 430 can rotate by one Φ in the counterclockwise direction each time plunger 42 is pressed and released. The continual rotation of rotor 430 by one Φ can cause push member 40 to move into the first and second positions alternately. When pin 50 is urged upwards into a transitional position, control valve 301 of water valve 30 can be driven by pin 50 to move into the first position enabling mixing air with water to provide the mixture of water-and-air flow. Because pin 50 will move down once push member 40 moves into a first or second position, push member 40 can be operated again from the first or second position. Depending on the design and/or setting of control valve 301, control valve 301 may be configured to remain in the first position after it is moved into that position. Namely, push member 40 will need to be operated again to cause control valve 301 to move from the first position to the second position enabling shut-off of the mixture of water-and-air flow. To achieve this, push member 40 can be operated again from its current position (i.e., the first or second position). Thus, when pin 50 is urged upwards into the transitional position, control valve 301 can be driven by pin 50 to move to the second position. In this kind of configuration, a user can operate push member 40 by pressing and releasing plunger 42 once to "turn on" the faucet head to give the water-and-air flow, and the user can press and release plunger 42 again to "turn off" the faucet head to shut off the water-and-air flow.

When push member 40 moves into the first position, teeth 435 of rotating device 43 can move into deep grooves 412*a* of seat 41 and push teeth 425 of plunger 42 to move plunger 42 away from second end 4102 of seat 41 until plunger 42 reaches a position most distant from second end 4102 or until lugs 424 of plunger 42 contact with and are stopped by ends 4120. As a result, nose 421 of plunger 42 can be most distant from seat 41 or outer casing 10, thereby indicating an "off" position of push member 40 to a user visually, in the first position. Additionally or alternatively, because teeth 435, or rotating device 43 as a whole, is now closest to first end 4101 of seat 41, teeth 435 will need to travel a substantially long distance in grooves 412*a* before teeth 435 can disengage from grooves 412*a* to allow push member 40 to move into the second position from the first position. This substantially long distance of traversal by teeth 435 can provide feedback, or a "feel" of handling, to the user that push member 40 is operated from an "off" position solely based on the operation itself.

When push member 40 moves into the second position, teeth 435 of rotating device 43 can move to engage with ends 4121 and remain in channels 4125, but unable to move into shallow grooves 412*b*. During the movement, while teeth 435 can push teeth 425, and hence plunger 42 as a whole, to move towards first end 4101 of seat 41 by a relative short distance (as compared with the distance traveled by teeth 435 in grooves 412*a*) along the long sides 4132 of the adjacent teeth 413, plunger 42 will not be pushed any further once teeth 435 are engaged with ends 4121. As a result, in the second position, plunger 42 can now generally remain in a position in which plunger 42 has not reached the most distant position from second end 4102 of seat, with lugs 424 being in a middle portion of grooves 412*b* and not reaching to contact with ends 4120. This can indicate an "on" position of push member 40 to the user visually. Additionally or alternatively, because rotating device 43 is now further away from first end 4101 of seat 41 than it is in the first position, teeth 435 will travel the relative short distance (as compared with the distance traveled by teeth 435 in grooves 412*a*) along the long sides 4132 of the adjacent teeth 413 before coming off the tips of teeth 413 to allow push member 40 to move into the first position from the second position. This relative short distance of traversal by teeth 435 can provide feedback, or a "feel" of handling, to the user that push member 40 is operated from an "on" position solely based on the operation itself.

The above configuration is only exemplary, and the "on" and "off" configurations of push member 40 may be reversed so that the "on" position requires the user to press plunger 42 less deeply into the faucet head than the "off" position.

As discussed above, control valve 301 can be configured to remain in the first position after push member 40 (or more specifically, plunger 42) is pressed and released. For example, plunger 42 can be released after being pressed to cause control valve 301 to move to and remain in the first position until push member 40 is operated again, such as by pressing plunger 42 again, to cause control valve 301 to move from the first position to the second position.

Referring to FIGS. 3-7, chamber 11 can include, in cylinder 20, for example, a cavity 24 located in inlet segment 201, cavity 25 formed at a bottom of cavity 24, and through hole 26 in spatial communication with cavity 25. At least one first orifice 21 can communicate with cavity 24 and the outlet segment 202. Water valve 30 can be housed in cavity 24, and driving member 31 can be accommodated in cavity 25.

Figure 16:
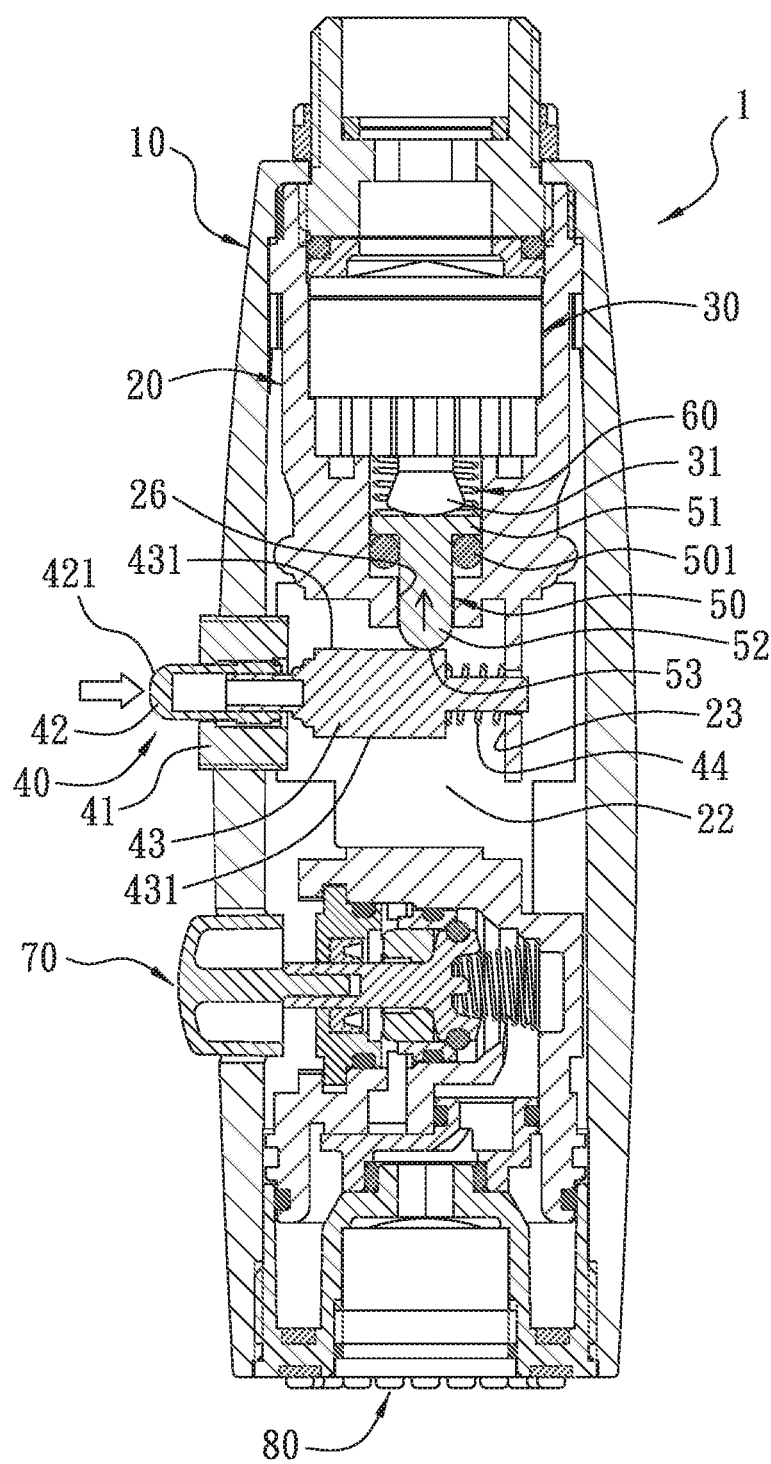
FIG. 16 is a cross-sectional view illustrating an embodiment of a faucet head consistent with the present invention.

Outer casing 10 can include a wall 12 configured to define chamber 11. Outer casing 10 can include an opening 13 defined in wall 12 corresponding to push member 40 so that push member 40 can operated through opening 13 when plunger 42 is pressed, as shown in FIGS. 3 and 16.

Referring to FIGS. 3-5 and 10, faucet head 1 can further include a compression spring 60 in cavity 25. Compression spring 60 can be accommodated between water valve 30 and head 51 of pin 50 to press down pin 50 against rotor 430, preventing pin 50 from undesired disengagement from rotor 430.

An on-off indicator can be formed on plunger 42 and/or seat 41 to indicate whether plunger 42 is pressed or released. For example, the indicator can indicate an "on" status when plunger 42 is pressed and an "off" status when plunger 42 is not operated or is released after pressing. The indicator can indicate the "on" and/or "off" status using symbols, illumination, or other means.

Body 52 of pin 50 has can include a first seal washer 501 fitted thereon and sealing cavity 25 so as to prevent water leakage via through hole 26 from cavity 25, as illustrated in FIGS. 3 and 4.

Chamber 11 can provide a housing near second end 112 of chamber 11 to enclose a switch valve 70 guiding a flow of the water-and-air mixture between a stream discharge and a spray discharge. Switch valve 70 can be operated via a switch movably mounted on a side opening of faucet head 1.

For example, faucet head 1 can include switch valve 70 near second end 112 of chamber 11 to switch a flow of the water-and-air mixture between a stream discharge and a spray discharge. For example, switch valve 70 can be arranged on cylinder 20 and configured to switch a water flow between a stream discharge mode and a spray discharge mode. Faucet head 1 can include a water outlet 80, as shown in FIGS. 3 and 4. Switch valve 70 can be operated, such as by pressing, to cause the water to be guided through a center outlet 81 or a plurality of peripheral outlets 82 of water outlet 80 from the at least one first orifice 21 to produce at least two water discharge modes, such as a stream discharge mode and a spray discharge mode.

With reference to FIGS. 6 and 7, cylinder 20 can include a cavity 27 communicating with the at least one first orifice 21 to accommodate switch valve 70. Cylinder 20 can further include a recess 28 for accommodating water outlet 80. Recess 28 can include a central channel 281 and a peripheral channel 282 communicating with cavity 27.

Second end 112 of chamber 11 can provide a stream discharge of a water-and-air mixture through center outlet 81 of water outlet 80 and a spray discharge of a mixture of water and air through the plurality of peripheral outlets 82 of water outlet 80. Center outlet 81 can be in communication with and discharge water from central channel 281. The plurality of peripheral outlets 82 can be in communication with and discharge water from peripheral channel 282. Center outlet 81 can include a foam generator 811 to produce foamy water.

Cylinder 20 can be adapted to match with a water outlet so as to discharge water from the at least one first orifice 21 in a particular discharge mode.

Referring to FIGS. 3-5, faucet head 1 can further include an inflow connector 91 engaged at a top of cavity 24. Inflow connector 91 can include a threaded portion 911 extending from outer casing 10, a nut 92 engaging with threaded portion 911 of inflow connector 91 and locking inflow connector 91 and cylinder 20 to the top of outer casing 10, a padding 93 located between inflow connector 91 and a top of water valve 30 to limit water valve 30 in cavity 24, and a second seal washer 94 fitted on padding 93 and contacting with cavity 24.

When control valve 301 of water valve 30 is configured to operate automatically, driving member 31 can be driven to move control valve 301 to a position enabling water discharge. Thereafter, control valve 301 can move back to an original position to stop discharging water.

When control valve 301 is not configured to be automatic, push member 40 can be manually operated by the user to close control valve 301. Push member 40 can be operated to drive driving member 31 of water valve 30 to move control valve 301 to a position enabling shut-off of water.

Thus, water valve 30 can be driven by push member 40 so as to avoid touching and contaminating water valve 30. Push member 40 can be connected with cylinder 20 as described herein to simplify faucet head 1 and reduce fabrication cost.

Water valve 30 can be a pre-assembled assembly with a control valve, such as control valve 301, inside the water valve and with a driving member, such as driving member 31, protruding through one end of the water valve and coupled with the control valve to cause the control valve to move between a first and a second position, such as between the first and second position described above.

Faucet head 1 can be further adapted to discharge water in different discharge modes using means other than switch valve 70.

While the preferred embodiments of the invention have been set forth for the purpose of disclosure, modifications of the disclosed embodiments of the invention as well as other embodiments thereof may occur to skilled in the art. Accordingly, the appended claims are intended to cover all embodiments which do not depart from the spirit and scope of the invention.

What is claimed is:

1. A faucet comprising:
  a faucet base having a first end and a second end, the faucet base being adapted to be mounted to support the faucet near the first end and to regulate a water flow;
  a water hose coupled with the faucet base by extending through the first end and second end of the faucet base, the water hose being adapted to be flexible and movable through an opening in the first end and through an opening in the second end;
  a faucet head movably coupled to the second end of the faucet base, the faucet head being adapted to be dismountable from the second end of the faucet base while remaining coupled to the water hose to direct a mixture of water-and-air flow to a location away from the faucet base and to be relocated back to the second end the faucet base to discharge the mixture of water-and-air flow while being coupled to the faucet base;
  a chamber within the faucet head having a first end and a second end, the first end of the chamber being coupled with the water hose and being coupled, in a dismountable manner, to the second end of the faucet base, the second end of the chamber providing an outlet to discharge the mixture of water-and-air flow;
  a water valve within the chamber between the first end and the second end of the chamber, the water valve comprising:
    at least one air inlet and a water inlet to enable mixing air from the at least one air inlet with water from the water inlet, the water inlet being coupled with the water hose, the at least one air inlet being coupled with the chamber, and
    a control valve movable within the water valve between a first position and a second position, the first position enabling mixing air from the at least one air inlet with water from the water inlet to provide the mixture of water-and-air flow, and the second position enabling shut-off of the mixture of water-and-air flow, a direction of the control valve's movement between the first position and the second position being substantially parallel to a direction of the water flow from the first end of the chamber to the second end of the chamber, the control valve using a water pressure from the water supplied by the water hose to facilitate an operation of the control valve; and
  a push member movably coupled with the faucet head and comprising a plunger and a rotating device movably coupled to the plunger and the control valve, the push member being adapted to enable an operation of the control valve within the water valve by pressing the plunger from a side of the faucet head to cause the rotating device to rotate between a first angular position and a second angular position relative to the plunger, a rotation of the rotating device between the first and second angular positions causing the control valve to move between the first position and the second position, wherein the plunger is pressed to cause the control valve to move from the second position to the first position, and the control valve remains in the first position until the plunger is further pressed to cause the control valve to move from the first position to the second position.

2. The faucet of claim 1, wherein the plunger is adapted for user operation in a direction substantially perpendicular to a side surface of the faucet head, the rotating device being adapted to engage with the control valve so that the rotating device rotating to a different angular position from a current angular position causes the control valve to move between the second position and the first position every time the plunger is pressed and released.

3. The faucet of claim 2, wherein the push member comprises a spring that urges against the plunger when the plunger is being pressed.

4. A faucet comprising:
a faucet base having a first end and a second end, the faucet base being adapted to be mounted to support the faucet near the first end and to regulate a water flow;
a water hose coupled with the faucet base by extending through the first end and second end of the faucet base, the water hose being adapted to be flexible and movable through an opening in the first end and through an opening in the second end;
a faucet head movably coupled to the second end of the faucet base, the faucet head being adapted to be dismountable from the second end of the faucet base while remaining coupled to the water hose to direct a mixture of water-and-air flow to a location away from the faucet base and to be relocated back to the second end the faucet base to discharge the mixture of water-and-air flow while being coupled to the faucet base;
a chamber within the faucet head having a first end and a second end, the first end of the chamber being coupled with the water hose and being coupled, in a dismountable manner, to the second end of the faucet base, the second end of the chamber providing an outlet to discharge the mixture of water-and-air flow;
a water valve within the chamber between the first end and the second end of the chamber, the water valve comprising:
at least one air inlet and a water inlet to enable mixing air from the at least one air inlet with water from the water inlet, the water inlet being coupled with the water hose, the at least one air inlet being coupled with the chamber, and
a control valve movable within the water valve between a first position and a second position, the first position enabling mixing air from the at least one air inlet with water from the water inlet to provide the mixture of water-and-air flow, and the second position enabling shut-off of the mixture of water-and-air flow, a direction of the control valve's movement between the first position and the second position being substantially parallel to a direction of the water flow from the first end of the chamber to the second end of the chamber, the control valve using a water pressure from the water supplied by the water hose to facilitate an operation of the control valve; and
a push member movably coupled with the faucet head and comprising a plunger and a rotating device movably coupled to the plunger and the control valve, the push member being adapted to enable an operation of the control valve within the water valve by pressing the plunger from a side of the faucet head to cause the rotating device to rotate between a first angular position and a second angular position relative to the plunger, a rotation of the rotating device between the first and second angular positions causing the control valve to move between the first position and the second position, wherein the push member further comprises a seat and a spring, the plunger and the rotating device being adapted to be slidably coupled to the seat, the spring being adapted to be coupled to the rotating device to urge the rotating device towards the plunger, the plunger being adapted to drive the rotating device, while the plunger is being pressed, in a direction away from the seat and cause the rotation device to rotate upon the urging of the spring.

5. A faucet comprising:
a faucet base having a first end and a second end, the faucet base being adapted to be mounted to support the faucet near the first end and to regulate a water flow;
a water hose coupled with the faucet base by extending through the first end and second end of the faucet base, the water hose being adapted to be flexible and movable through an opening in the first end and through an opening in the second end;
a faucet head movably coupled to the second end of the faucet base, the faucet head being adapted to be dismountable from the second end of the faucet base while remaining coupled to the water hose to direct a mixture of water-and-air flow to a location away from the faucet base and to be relocated back to the second end the faucet base to discharge the mixture of water-and-air flow while being coupled to the faucet base;
a chamber within the faucet head having a first end and a second end, the first end of the chamber being coupled with the water hose and being coupled, in a dismountable manner, to the second end of the faucet base, the second end of the chamber providing an outlet to discharge the mixture of water-and-air flow;
a water valve within the chamber between the first end and the second end of the chamber, the water valve comprising:
at least one air inlet and a water inlet to enable mixing air from the at least one air inlet with water from the water inlet, the water inlet being coupled with the water hose, the at least one air inlet being coupled with the chamber, and
a control valve movable within the water valve between a first position and a second position, the first position enabling mixing air from the at least one air inlet with water from the water inlet to provide the mixture of water-and-air flow, and the second position enabling shut-off of the mixture of water-and-air flow, a direction of the control valve's movement between the first position and the second position being substantially parallel to a direction of the water flow from the first end of the chamber to the second end of the chamber, the control valve using a water pressure from the water supplied by the water hose to facilitate an operation of the control valve; and
a push member movably coupled with the faucet head and comprising a plunger and a rotating device movably coupled to the plunger and the control valve, the push member being adapted to enable an operation of the control valve within the water valve by pressing the plunger from a side of the faucet head to cause the rotating device to rotate between a first angular position and a second angular position relative to the plunger, a rotation of the rotating device between the first and second angular positions causing the control valve to move between the first position and the second position, wherein a center axis of the rotating device is coaxial with a center axis of the plunger, the rotating device comprising, along a part of its outer and substantially rounded shape, regions of a first radius and regions of a second radius that are adapted to, when the rotating device is rotated, cause the control valve to move between the first and second position.

6. A faucet comprising:
a faucet base having a first end and a second end;
a water hose extending within the faucet base and being movable through the second end of the faucet base;
a faucet head having a first end, a second end, a chamber between the first end and the second end of the faucet head and coupled with the water hose, and an outlet coupled with the chamber at or near the second end of the faucet head to discharge a mixture of water-and-air flow, the first end of the faucet head being adapted to be coupled to the second end of the faucet base while remaining coupled to the water hose, and the first end of the faucet head being adapted to be dismountable from the second end of the faucet base while remaining coupled to the water hose;
a water valve within the chamber, the water valve comprising:
  one or more air inlets and a water inlet to enable mixing air from the one or more air inlets with water from the water inlet, the water inlet coupled with the water hose, the one or more air inlets being coupled with the chamber, and
  a control valve movable within the water valve between a first position and a second position, the first position enabling mixing air from the air inlet with water from the water inlet to provide the mixture of water-and-air flow, and the second position enabling shut-off of the mixture of water-and-air flow, the control valve being adapted to move between the first position and the second position in a direction that is substantially parallel to a direction of a water flow from the first end of the faucet head to the second end of the faucet head, the control valve using a water pressure from the water supplied by the water hose to facilitate an operation of the control valve; and
a push member having a plunger movably coupled with the faucet head at a side of the faucet head and a rotating device rotatably coupled with the plunger, the plunger being adapted for user operation by pressing to cause the rotating device to rotate from a first angular position to a second angular position relative to the plunger, a rotation of the rotating device from the first to second angular position causing the control valve to move between the first position and the second position, wherein
the rotation of the rotating device from the first to second angular position causes the control valve to move from the second position to the first position, wherein
pressing the plunger again causes the rotating device to rotate from the second angular position to a third angular position, a rotation of the rotating device from the second to third angular position causes the control valve to move from the first position to the second position.

7. A faucet comprising:
a faucet base having a first end and a second end;
a water hose extending within the faucet base and being movable through the second end of the faucet base;
a faucet head having a first end, a second end, a chamber between the first end and the second end of the faucet head and coupled with the water hose, and an outlet coupled with the chamber at or near the second end of the faucet head to discharge a mixture of water-and-air flow, the first end of the faucet head being adapted to be coupled to the second end of the faucet base while remaining coupled to the water hose, and the first end of the faucet head being adapted to be dismountable from the second end of the faucet base while remaining coupled to the water hose;
a water valve within the chamber, the water valve comprising:
  one or more air inlets and a water inlet to enable mixing air from the one or more air inlets with water from the water inlet, the water inlet coupled with the water hose, the one or more air inlets being coupled with the chamber, and
  a control valve movable within the water valve between a first position and a second position, the first position enabling mixing air from the air inlet with water from the water inlet to provide the mixture of water-and-air flow, and the second position enabling shut-off of the mixture of water-and-air flow, the control valve being adapted to move between the first position and the second position in a direction that is substantially parallel to a direction of a water flow from the first end of the faucet head to the second end of the faucet head, the control valve using a water pressure from the water supplied by the water hose to facilitate an operation of the control valve; and
a push member having a plunger movably coupled with the faucet head at a side of the faucet head and a rotating device rotatably coupled with the plunger, the plunger being adapted for user operation by pressing to cause the rotating device to rotate from a first angular position to a second angular position relative to the plunger, a rotation of the rotating device from the first to second angular position causing the control valve to move between the first position and the second position, wherein the control valve is adapted to remain in the first position after the plunger is pressed and released, and the plunger is adapted to be pressed again to cause the control valve to move from the first position to the second position.

8. The faucet of claim 6, wherein the control valve comprises a driving member protruding from the water valve, the driving member being adapted to be moved by the rotating device to cause the control valve to move.

9. The faucet of claim 6, wherein the rotating device is adapted to continually rotate each time the plunger is pressed and released to cause the control valve to move alternately between the first position and the second position.

10. The faucet of claim 6, further comprising a spring provided to urge the rotating device towards the plunger.

11. The faucet of claim 6, wherein the rotating device is adapted to convert a lateral movement of the plunger into a rotation of the rotating device when the plunger is pressed to move in a direction towards the rotating device.

12. The faucet of claim 6, wherein the rotating device includes regions of a first radius, regions of a second radius, and transitional regions between the regions of the first radius and the second radius, a profile of the rotating device is adapted to cause the control valve to move between the first and second position when the rotating device is rotated.

13. The faucet of claim 12, further comprising a pin positioned between the rotating device and a driving member of the control valve, the pin being adapted to engage with at least one of the regions of the first radius when the control valve is in either the first position or the second position.

14. A faucet comprising:
a faucet base having a first end and a second end;
a water hose extending through the first end and second end of the faucet base and being movably coupled with the faucet base;
a faucet head movably coupled to the second end of the faucet base and coupled to the water hose, the faucet head being adapted to be dismountable from the second end of the faucet base while remaining coupled to the water hose, the faucet head having a chamber within the faucet head including a first end and a second end, the first end of the chamber being coupled with the water hose and being coupled, in a dismountable manner, to the second end of the faucet base, and the second end of the chamber providing an outlet to discharge a mixture of water-and-air flow;
a water valve within the chamber between the first end and the second end of the chamber, the water valve enabling provision of the mixture of water-and-air flow, the water valve having a control valve movable within the water valve between a first position and a second position, the first position enabling the provision of the mixture of water-and-air flow, the second position enabling shut-off of the mixture of water-and-air flow, a direction of the control valve's movement between the first position and the second position being substantially parallel to a direction of a water flow from the first end of the chamber to the second end of the chamber; and
a push member movably coupled with the faucet head and comprising a plunger and a rotating device movably coupled to the plunger and the control valve, the push member being adapted to enable an operation of the control valve within the water valve by pressing the plunger from a side of the faucet head to cause the rotating device to rotate between a first angular position and a second angular position relative to the plunger, and a rotation of the rotating device between the first and second angular positions causing the control valve to move between the first position and the second position,
wherein the control valve is adapted to remain in the first position after the plunger is pressed and released, and the plunger is adapted to be pressed again to cause the control valve to move from the first position to the second position.

15. A faucet comprising:
a faucet base having a first end and a second end;
a water hose extending through the first end and second end of the faucet base and being movably coupled with the faucet base;
a faucet head movably coupled to the second end of the faucet base and coupled to the water hose, the faucet head being adapted to be dismountable from the second end of the faucet base while remaining coupled to the water hose, the faucet head having a chamber within the faucet head including a first end and a second end, the first end of the chamber being coupled with the water hose and being coupled, in a dismountable manner, to the second end of the faucet base, and the second end of the chamber providing an outlet to discharge a mixture of water-and-air flow;
water valve within the chamber between the first end and the second end of the chamber, the water valve enabling provision of the mixture of water-and-air flow, the water valve having a control valve movable within the water valve between a first position and a second position, the first position enabling the provision of the mixture of water-and-air flow, the second position enabling shut-off of the mixture of water-and-air flow, a direction of the control valve's movement between the first position and the second position being substantially parallel to a direction of a water flow from the first end of the chamber to the second end of the chamber; and
a push member movably coupled with the faucet head and comprising a plunger and a rotating device movably coupled to the plunger and the control valve, the push member being adapted to enable an operation of the control valve within the water valve by pressing the plunger from a side of the faucet head to cause the rotating device to rotate between a first angular position and a second angular position relative to the plunger, and a rotation of the rotating device from the first to second angular position causing the control valve to move from the second position to the first position,
wherein the plunger is adapted to be pressed again, when the rotating device is in the second angular position, to cause the rotating device to rotate from the second angular position to a third angular position, and the rotation of the rotating device from the second to third angular position causes the control valve to move from the first position to the second position.

* * * * *